(12) United States Patent
Bang et al.

(10) Patent No.: US 12,531,706 B2
(45) Date of Patent: Jan. 20, 2026

(54) USER EQUIPMENT AND SERVING CELL PERFORMING COMMUNICATION BASED ON NEW RADIO NETWORK, AND OPERATING METHODS THEREOF

(71) Applicant: SAMSUNG ELECTRONICS CO., LTD., Suwon-si (KR)

(72) Inventors: Jonghyun Bang, Suwon-si (KR); Jungmin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 499 days.

(21) Appl. No.: 17/993,558

(22) Filed: Nov. 23, 2022

(65) Prior Publication Data
US 2023/0163931 A1    May 25, 2023

(30) Foreign Application Priority Data

Nov. 24, 2021  (KR) .................. 10-2021-0163768
Jun. 10, 2022  (KR) .................. 10-2022-0071032

(51) Int. Cl.
*H04L 5/00*  (2006.01)
*H04W 72/23*  (2023.01)

(52) U.S. Cl.
CPC .......... *H04L 5/0092* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 11,297,640 | B2 | 4/2022 | Oh et al. |
| 2019/0082431 | A1* | 3/2019 | Yi .................. H04L 5/0055 |
| 2019/0349059 | A1 | 11/2019 | John Wilson et al. |
| 2020/0100223 | A1* | 3/2020 | Park .................. H04L 5/0092 |
| 2020/0100276 | A1 | 3/2020 | Oh et al. |
| 2020/0228966 | A1 | 7/2020 | Xu et al. |
| 2021/0127398 | A1 | 4/2021 | Nam et al. |
| 2021/0274562 | A1 | 9/2021 | Takeda et al. |
| 2021/0400606 | A1 | 12/2021 | Zhou et al. |
| 2022/0240253 | A1* | 7/2022 | Sakhnini ............. H04L 5/0048 |

FOREIGN PATENT DOCUMENTS

| | | | | |
|---|---|---|---|---|
| KR | 10-2021-0063411 A | 6/2021 | | |
| WO | WO-2019137401 A1 * | 7/2019 | ........... | H04L 1/0071 |
| WO | WO-2019139955 A1 * | 7/2019 | ......... | H04B 17/3912 |
| WO | WO-2020204557 A1 * | 10/2020 | ........... | H04W 24/10 |
| WO | WO-2021070065 A1 * | 4/2021 | ........... | H04L 5/0053 |

* cited by examiner

*Primary Examiner* — Shukri Taha
(74) *Attorney, Agent, or Firm* — Sughrue Mion, PLLC

(57) ABSTRACT

An operating method of a user equipment performing new radio (NR) network-based communication with a serving cell in a narrow band includes receiving a CORESET and pointing information from the serving cell, the pointing information indicating a valid region in a region of the CORESET, identifying the valid region in the CORESET, based on the pointing information, selectively decoding a portion of the CORESET, the portion of the CORESET corresponding to the valid region, and obtaining downlink control information (DCI) based on a result of the decoding.

17 Claims, 25 Drawing Sheets

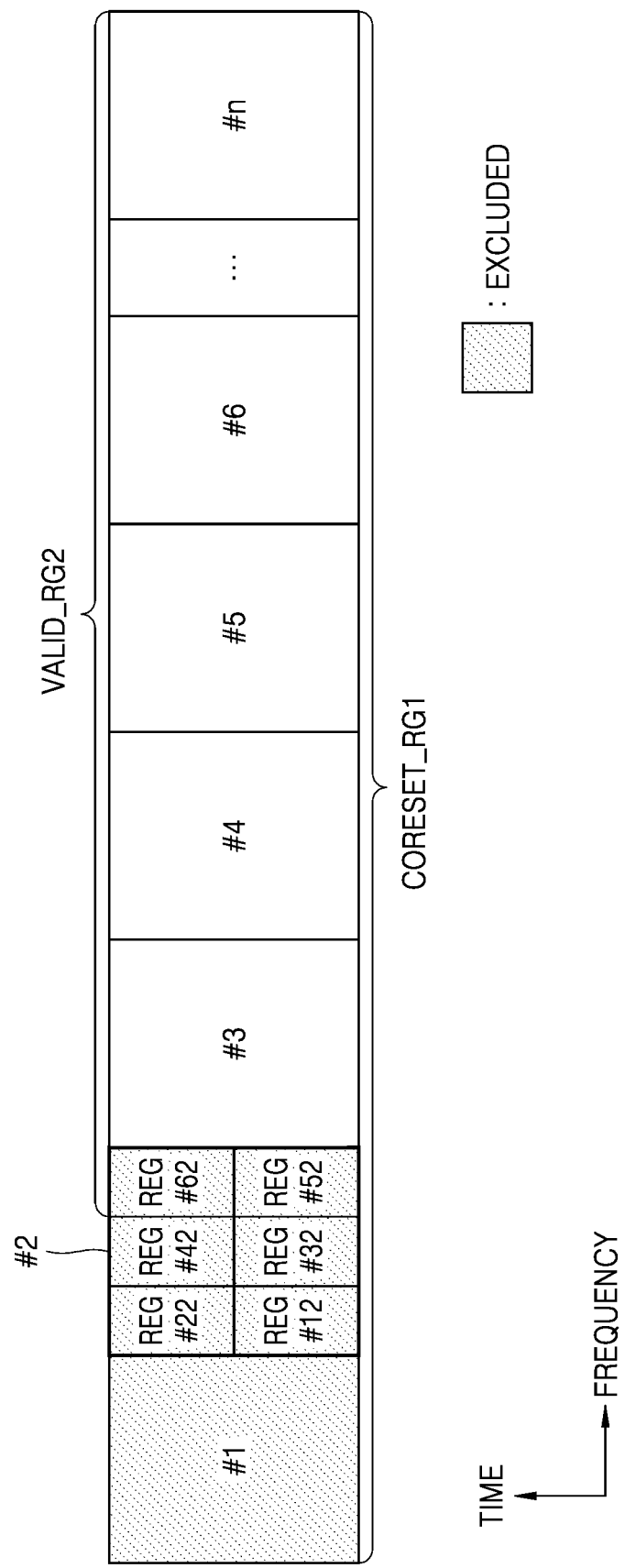

| INDEX | SS/PBCH BLOCK AND CORESET MULTIPLEXING PATTERN | NUMBER OF RBs $N_{RB}^{CORESET}$ | NUMBER OF SYMBOLS $N_{symb}^{CORESET}$ | OFFSET (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1 | 96 | 1 | 38 |
| 13 | 1 | 96 | 2 | 38 |
| 14 | 1 | 96 | 3 | 38 |
| 15 | RESRVED | | | |

: SUBFIELD THAT MAY BE USED AS POINTING INFORMATION

USER EQUIPMENT AND SERVING CELL PERFORMING COMMUNICATION BASED ON NEW RADIO NETWORK, AND OPERATING METHODS THEREOF

CROSS-REFERENCE TO RELATED APPLICATIONS

This application is based on and claims priority under 35 U.S.C. § 119 to Korean Patent Application Nos. 10-2021-0163768, filed on Nov. 24, 2021 and 10-2022-0071032, filed on Jun. 10, 2022, in the Korean Intellectual Property Office, the disclosures of which are incorporated by reference herein in their entirety.

BACKGROUND

1. Field

The disclosure relates to wireless communication, and more particularly, to a user equipment (UE) and a serving cell, which perform communication based on a new radio (NR) network, and operating methods thereof.

2. Description of Related Art

In related art, NR network-based communication, a minimum bandwidth, in which signaling between a serving cell and a UE is performed for initial access, is defined as a certain value. In other words, in related art NR network-based communication, transmitting and receiving a Control Resource Set (CORESET) in a bandwidth that is less than a certain value is not considered.

Recently, techniques for supporting communication using a narrow band that is less than a certain value have been suggested to increase versatility and efficiency in an NR network. Therefore, a new method of configuring a CORESET in the initial access between a serving cell and a UE is desired for narrow-band communication.

SUMMARY

The disclosure provides a user equipment (UE) for identifying a valid region corresponding to a narrow band in the region of a Control Resource Set (CORESET) and effectively obtaining downlink control information (DCI) by decoding a portion of the CORESET, which corresponds to the valid region, and an operating method of the UE.

The disclosure also provides a serving cell for generating and providing pointing information for a UE such that the UE may effectively identify a valid region corresponding to a narrow band in the region of a CORESET and an operating method of the serving cell.

According to an aspect of the disclosure, there is provided an operating method of a user equipment (UE) performing new radio (NR) network-based communication with a serving cell in a narrow band, the operating method including: receiving a Control Resource Set (CORESET) and pointing information from the serving cell; identifying a valid region in the CORESET based on the pointing information; selectively decoding a portion of the CORESET corresponding to the valid region; and obtaining downlink control information (DCI) based on a result of the decoding.

The narrow band may be less than 5 MHz.

The valid region may include resource element groups (REGs) belonging to the narrow band.

The operating method may further include: receiving CORESET configuration information from the serving cell, wherein the CORESET configuration information includes the pointing information.

The operating method may further include receiving a master information block (MIB) from the serving cell through a physical broadcast channel (PBCH), wherein the MIB includes the pointing information.

The pointing information may be included in one or more of fields that are not used in the narrow band among fields of the MIB.

The one or more fields may include at least one a subcarrier spacing common field, an SSB subcarrier offset field, or a PDCCH configSIB1 field.

The pointing information may include offset information indicating at least one of a start point or an end point of the valid region.

The operating method of may further include receiving, from the serving cell, a valid synchronization signal block (SSB) corresponding to the narrow band, wherein the pointing information includes offset information indicating at least one of a start point or an end point of the valid region based on a position of the valid SSB.

A band occupied by the valid region may be narrower than a band occupied by the valid SSB.

The selectively decoding of the portion of the CORESET may include: identifying a plurality of second physical downlink control channel (PDCCH) candidate groups that are completely in the valid region among a plurality of first PDCCH candidate groups of the CORESET; and performing blind decoding on the plurality of second PDCCH candidate groups.

According to an aspect of the disclosure, there is provided an operating method of a serving cell performing new radio (NR) network-based communication with a user equipment (UE), the operating method including: allocating a narrow band for communication with the UE; generating pointing information and a CORESET, the pointing information indicating a valid region in a region of the CORESET, the valid region including a plurality of physical downlink control channel (PDCCH) candidate groups to be decoded by the UE; and transmitting the CORESET and the pointing information to the UE.

The generating of the CORESET may include allocating downlink control information (DCI) to at least one of the plurality of PDCCH candidate groups.

The pointing information may include offset information indicating at least one of a start point and an end point of the valid region.

The operating method may further include: puncturing a synchronization signal block (SSB) to generate a valid SSB corresponding to the narrow band; and transmitting the valid SSB to the UE, wherein the pointing information includes offset information indicating at least one of a start point and an end point of the valid region based on a position of the valid SSB.

The generating of the pointing information may include generating the pointing information by using one or more fields that are not used in the narrow band among fields of a master information block (MIB) transmitted to the UE through a physical broadcast channel (PBCH).

A subcarrier spacing of 15 kHz may be set in the narrow band, and the narrow band includes at most 24 resource blocks (RBs) on a frequency axis.

According to an aspect of the disclosure, there is provided a user equipment (UE) performing new radio (NR) network-based communication with a serving cell in a narrow band, the UE including: a radio frequency (RF) transceiver configured to receive a CORESET and pointing information from the serving cell; and a controller configured to: identify a valid region in the CORESET, based on the pointing information, selectively decode a portion of the CORESET corresponding to the valid region, and obtain downlink control information (DCI) based on a result of the decoding.

The controller may be further configured to: identify a plurality of second physical downlink control channel (PDCCH) candidate groups that belong to the valid region, among a plurality of first PDCCH candidate groups of the CORESET, and perform blind decoding on the plurality of second PDCCH candidate groups.

The pointing information may be constituted of at least one of a subcarrier spacing common field, a synchronization signal block (SSB) subcarrier offset field, or a PDCCH configSIB1 field among fields of a master information block (MIB).

According to an aspect of the disclosure, there is provided an apparatus including: a memory configured to store one or more instructions; and a processor configured to execute the one or more instructions to: receive a Control Resource Set (CORESET) and pointing information from an external apparatus; identify a valid region in the CORESET based on the pointing information; selectively decode a portion of the CORESET corresponding to the valid region; and obtain downlink control information (DCI) based on a result of the decoding.

BRIEF DESCRIPTION OF THE DRAWINGS

Embodiments of the disclosure will be more clearly understood from the following detailed description taken in conjunction with the accompanying drawings in which:

FIGS. 6A to 6C are diagrams for describing the decoding operation of a UE, according to an example embodiment;

DETAILED DESCRIPTION

Figure 1:
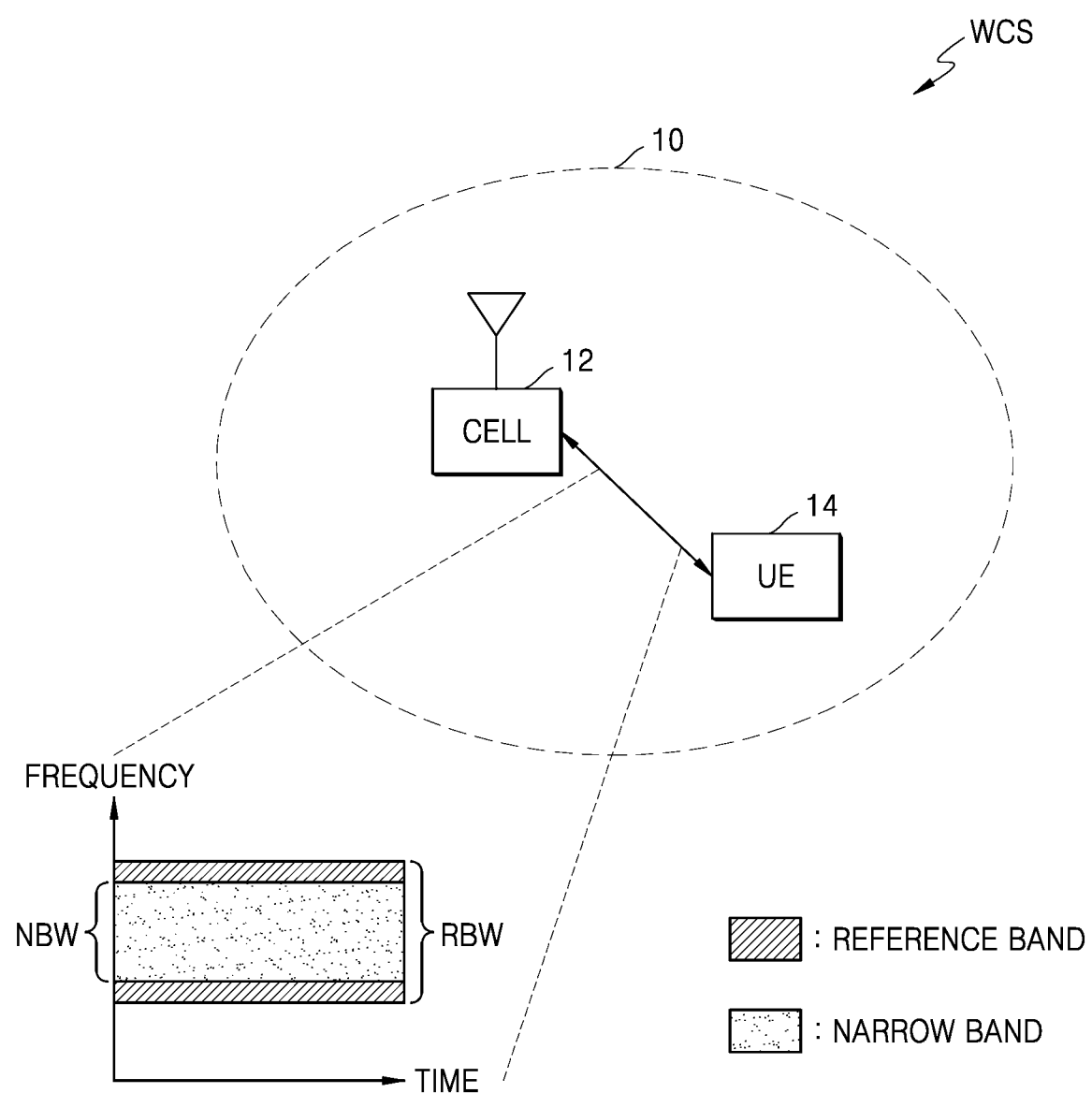
FIG. 1 is a diagram of a wireless communication system according to an example embodiment.

FIG. 1 is a diagram of a wireless communication system WCS according to an example embodiment.

Although embodiments are described below in accordance with the wireless communication system WCS based on a new radio (NR) network, and more particularly, with the 3rd Generation Partnership Project (3GPP) Release, embodiments are not limited to the NR network and may be applied to other wireless communication systems (e.g., cellular communication systems based on next-generation communication, such as long term evolution (LTE), LTE-advanced (LTE-A), wireless broadband (WiBro), global system for mobile communication (GSM), or sixth generation (6G), or local area communication systems using Bluetooth or near field communication (NFC)), which have a similar technical background or channel configuration.

Various functions described below may be implemented or supported by artificial intelligence (AI) technology or at least one computer program. Each program is composed of computer-readable program code and executed in computer-readable media. The terms "application" and "program" refer to at least one computer program, software component, instruction set, procedure, function, object, class, instance, or related data, or their part suitable for implementation of appropriate computer-readable program code. The term "computer-readable program code" includes any types of computer code including source code, object code, and execution code. The term "computer-readable media" includes any types of media, such as read-only memory (ROM), random access memory (RAM), hard disks, compact disks (CDs), digital video disks (DVDs), and other types of memory, which are accessible by a computer. Non-transitory computer-readable media preclude wired, wireless, optical, and other communication links which transmit transitory or other signals. Non-transitory computer-readable media include media, in which data may be permanently stored, and media, such as rewritable optical disks or erasable memory devices, in which data may be stored and overwritten later.

In embodiments described below, a hardware approach is explained as an example. However, embodiments include a technique using both hardware and software and do not preclude a software approach.

Referring to FIG. 1, the wireless communication system WCS may include a cell 12 and a user equipment (UE) 14. The cell 12 may usually refer to a fixed station, which communicates with the UE 14 and/or another cell, and may exchange data and control information with the UE 14 and/or another cell through communication. For example, the cell 12 may be referred to as a base station, a Node B, an evolved-Node B (eNB), a next generation Node B (gNB), a sector, a site, a base transceiver system (BTS), an access point (AP), a relay node, a remote radio head (RRH), a radio unit (RU), a small cell, an apparatus, or the like. Hereinafter, the cell 12 may be referred to as a serving cell 12, which provides NR network-based communication services for the UE 14.

The UE 14 may be stationary or mobile and may refer to one of random devices that may transmit and receive data and/or control information to and from the serving cell 12. For example, the UE 14 may be referred to as a terminal, a terminal equipment, a mobile station (MS), a mobile terminal (MT), a user terminal (UT), a subscriber station (SS), a wireless communication device, a wireless device, a device, a handheld device, or the like.

The serving cell 12 may provide WiBro access to the UE 14 in a coverage 10 thereof. To communicate with the UE 14, the serving cell 12 may adaptively allocate a band, taking into account the purpose of communication with the UE 14, the number of other UEs that are connected to the serving cell 12, the channel status of each UE, or the like.

In an example embodiment, the serving cell 12 may allocate a narrow band, which has a narrow bandwidth NBW that is less than a reference bandwidth RBW, for the communication with the UE 14. Here, the reference bandwidth RBW may be a preset reference. According to an example embodiment, a narrow band may be determined based on the reference bandwidth RBW. In some example embodiments, the reference bandwidth RBW may correspond to a minimum bandwidth in NR network-based communication defined in the 3GPP Release 17. For example, when the minimum bandwidth is 5 MHz, a band having a bandwidth that is less than 5 MHz may be determined to be a narrow band, and methods and operation in the example embodiments described below may be performed. Here, in the case where the serving cell 12 allocates a band and transmits a Control Resource Set (CORESET) to the UE 14, the band may be referred to as a narrow band when a part of a CORESET region including the CORESET is outside the band.

In an example embodiment, the serving cell 12 may generate and transmit a CORESET and pointing information to the UE 14 for initial access in a narrow band. The pointing information may indicate a valid region in a CORESET region, excluding a part of the CORESET region that is outside the narrow band. Here, a valid region in a CORESET region may be referred to as a "CORESET valid region". In an example embodiment, a CORESET valid region may include a plurality of resource element groups (REGs) belonging to a narrow band. REGs in a valid region may be classified by units of control channel elements (CCEs) according to a set REG bundle size.

In an example embodiment, pointing information may be constituted of one or more fields, which are not used in a narrow band among the fields defined in the standard specification of a master information block (MIB). In some example embodiments, the serving cell 12 may generate pointing information by using a field that is newly defined targeting a narrow band.

In an example embodiment, pointing information may indicate at least one of a start point or an end point of a CORESET valid region in a narrow band. The pointing information may be configured to directly indicate the CORESET valid region or indirectly indicate the CORESET valid region based on a valid synchronization signal block (SSB) related to a CORESET.

In an example embodiment, the UE 14 may identify a valid region, which belongs to a narrow band, in a CORESET, based on pointing information. In detail, the UE 14 may identify a CORESET region (also referred to as a region of the CORESET), based on CORESET configuration information received from the serving cell 12 together with the pointing information, and identify a valid region in the identified CORESET region, based on the pointing information. According to an example embodiment, the UE 14 may identify a CORESET region, based on CORESET configuration information received from the serving cell 12 together with the pointing information, and sequentially identify a valid region in the identified CORESET region, based on the pointing information.

In an example embodiment, the UE 14 may selectively decode a portion of a CORESET, which corresponds to a valid region of the CORESET region. In detail, the UE 14 may perform blind decoding on a plurality of second physical downlink control channel (PDCCH) candidate groups, which are completely in the valid region among a plurality of first PDCCH candidate groups of a CORESET. Here, PDCCH candidate group that are completely in a valid region mean that the REGs of the PDCCH candidate group are all in the valid region. In other words, the UE 14 may filter out PDCCH candidate groups, which include at least one REG that is outside the valid region, from the first PDCCH candidate groups and perform blind decoding using the remaining second PDCCH candidate groups.

In an example embodiment, the UE 14 may obtain downlink control information (DCI) from a blind decoding result. The UE 14 may receive a physical downlink shared channel (PDSCH) from the serving cell 12, based on the DCI.

According to an example embodiment, the serving cell 12 may provide pointing information, which indicates a valid region in the region of a CORESET in a narrow band, to the UE 14, and the UE 14 may effectively perform decoding by selectively decoding a portion of the CORESET, which corresponds to the valid region of the CORESET region, based on the pointing information. Consequently, overall communication performance may be increased.

Figure 2:
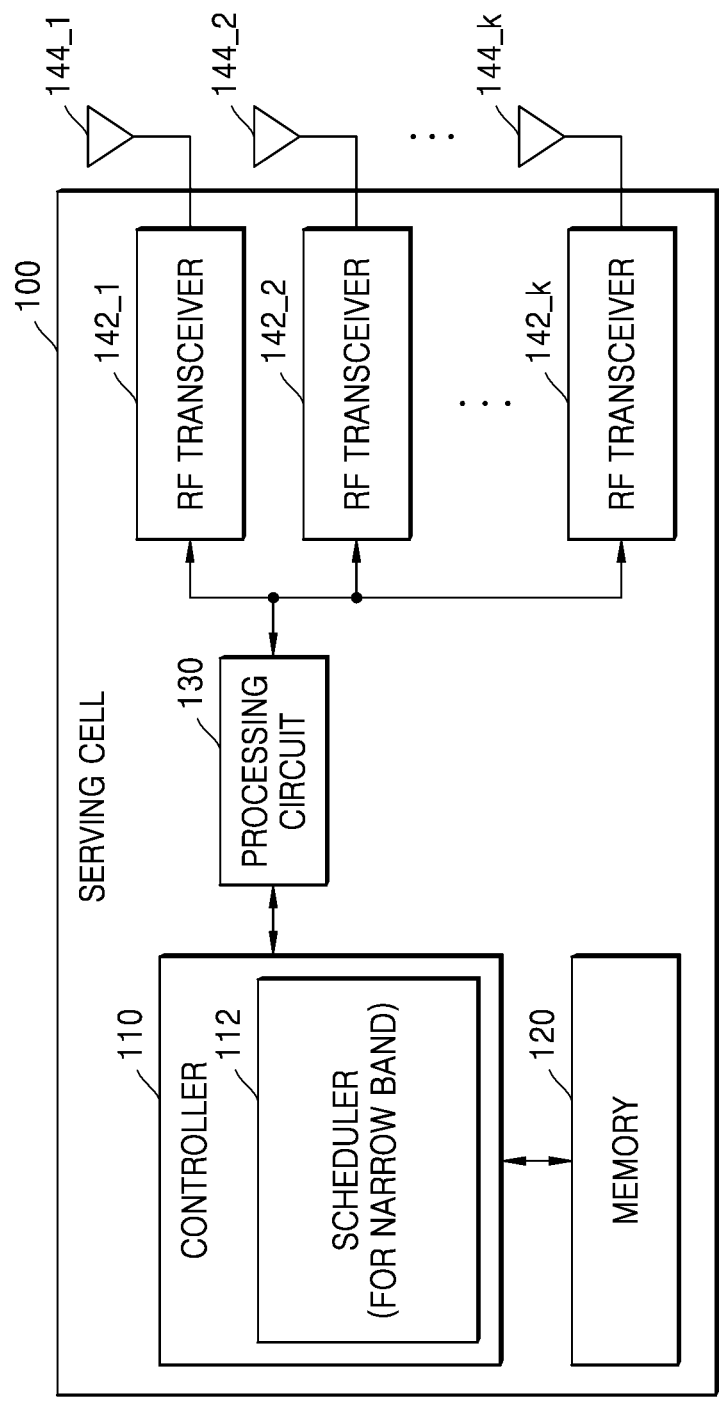
FIGS. 2 and 3 are respectively block diagrams of implementations of a serving cell and a user equipment (UE), according to an example embodiment.
Figure 3:
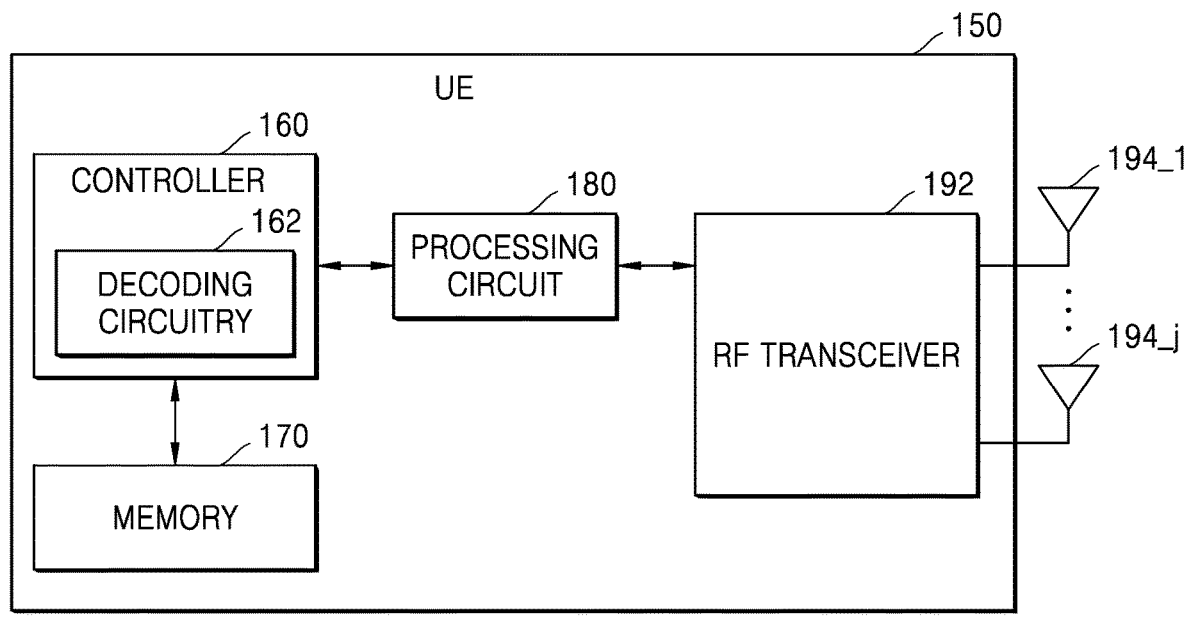

FIGS. 2 and 3 are respectively block diagrams of implementations of a serving cell 100 and a UE 150, according to an example embodiment. The implementations of the serving cell 100 of FIG. 2 and the UE 150 of FIG. 3 may be respectively applied to the serving cell 12 and the UE 14 in FIG. 1.

Referring to FIG. 2, the serving cell 100 may include a controller 110, a memory 120, a processing circuit 130, a plurality of radio frequency (RF) transceivers 142_1 to 142_k, and a plurality of antennas 144_1 to 144_k. Each of the RF transceivers 142_1 to 142_k may receive an RF signal from a UE in a coverage through a corresponding one of the antennas 144_1 to 144_k. Each of the RF transceivers 142_1 to 142_k may generate an intermediate frequency (IF) or a baseband signal by performing frequency down-conversion on the received RF signal. The processing circuit 130 may generate data signals by filtering, decoding, and/or digitizing IF or baseband signals. The controller 110 may additionally process the data signals.

The processing circuit 130 may receive data signals from the controller 110. The processing circuit 130 may encode, multiplex, and/or convert into analog the data signals. The RF transceivers 142_1 to 142_k may perform frequency up-conversion on IF or baseband signals output from the processing circuit 130 and transmit RF signals to UEs through the antennas 144_1 to 144_k.

The controller 110 may control the serving cell 100 for NR network-based communication and may include a scheduler 112 that performs scheduling to transmit CORESET configuration information to a UE, which communicates with the serving cell 100 through a narrow band in the coverage of the serving cell 100, wherein the CORESET configuration information includes pointing information indicating a CORESET valid region.

In an example embodiment, the scheduler 112 may generate pointing information, which indicates at least one of a start point or an end point of a CORESET valid region in a narrow band. For example, the pointing information may be included in an MIB transmitted from the serving cell 100 through a physical broadcast channel (PBCH). In detail, the scheduler 112 may generate the pointing information by using one or more fields, which are not used in a narrow band among the fields of the MIB. For example, because a subcarrier spacing of 15 kHz is fixedly set to transmit and receive necessary information in a narrow band, it may be impossible to select a subcarrier spacing, and accordingly, a 'subcarrier spacing common' field and an 'SSB subcarrier offset' field may be used to constitute pointing information. In addition, in a 'PDCCH configSIB1' field, subfields corresponding to indexes other than indexes corresponding to a subcarrier spacing of 15 kHz may be used to constitute pointing information in a narrow band. Furthermore, a reserved field of the MIB may be used to constitute pointing information in a narrow band. Alternatively, the scheduler 112 may generate pointing information using a field that is newly defined in the MIB. For example, the newly defined field may be configured to effectively indicate a CORESET valid region in a narrow band.

In an example embodiment, the scheduler 112 may generate a valid SSB corresponding to a narrow band by puncturing an SSB and may transmit the valid SSB to a UE. Here, it is assumed that a frequency region, in which a valid SSB is transmitted, coincides with a narrow band. The scheduler 112 may generate pointing information, which indicates at least one of a start point or an end point of a CORESET valid region, based on the position of the valid SSB. In some example embodiments, the scheduler 112 may generate CORESET configuration information, which additionally includes information indicating at least one of a start point or an end point of the valid SSB. The information indicating at least one of a start point or an end point of the valid SSB may be substituted with information indicating the start and end points of the narrow band.

In an example embodiment, the scheduler 112 may perform scheduling such that DCI is located in a CORESET valid region. In detail, the scheduler 112 may perform scheduling such that DCI is allocated to at least one of a plurality of second PDCCH candidate groups, which are completely in the CORESET valid region among a plurality of first PDCCH candidate groups of a CORESET. Accordingly, the scheduler 112 may support a UE to obtain DCI by selectively decoding only a portion of the CORESET, which corresponds to the CORESET valid region.

The controller 110 may execute a program and/or a process stored in the memory 120 to generally control the serving cell 100. In some example embodiments, the scheduler 112 may be stored in the memory 120 as program code, which is executed to perform scheduling according to example embodiments, and the controller 110 may access the memory 120 and execute the program code such that the operation of the scheduler 112 is performed.

According to an example embodiment, the controller 110 may include a processor, such as, a central processing unit (CPU), an application processor, a modem-integrated application processor, a system-on-chip (SoC), an integrated circuit, or the like.

Referring to FIG. 3, the UE 150 may include a controller 160, a memory 170, a processing circuit 180, an RF transceiver 192, and a plurality of antennas 194_1 to 194_j.

The RF transceiver 192 may receive RF signals from a serving cell through the antennas 194_1 to 194_j. The RF transceiver 192 may down-convert the RF signals into IF or baseband signals. The processing circuit 180 may generate data signals by filtering, decoding, and/or digitizing IF or baseband signals. The controller 160 may additionally process the data signals.

The processing circuit 180 may receive data signals from the controller 160. The processing circuit 180 may encode, multiplex, and/or perform digital-to-analog conversion on the data signals. The RF transceiver 192 may perform frequency up-conversion on IF or baseband signals output from the processing circuit 180 and transmit RF signals to the antennas 194_1 to 194_j.

According to an example embodiment, the controller 160 may control the UE 150 for NR network-based communication and include decoding circuitry 162, which identifies a valid region in a CORESET based on pointing information received from a serving cell and selectively decodes a portion of the CORESET, which corresponds to the valid region.

In an example embodiment, the decoding circuitry 162 may identify a plurality of second PDCCH candidate groups, which are completely in a valid region among a plurality of first PDCCH candidate groups of a CORESET, and perform blind decoding on the second PDCCH candidate group. The decoding circuitry 162 may obtain DCI through blind decoding.

The controller 160 may execute a program and/or a process stored in the memory 170 to generally control the UE 150. In some example embodiments, the decoding circuitry 162 may be stored in the memory 170 as program code, which is executed to decode a CORESET according to example embodiments, and the controller 160 may access the memory 170 and execute the program code such that the operation of the decoding circuitry 162 is performed.

According to an example embodiment, the controller 160 may include a processor, such as, a central processing unit (CPU), an application processor, a modem-integrated application processor, a system-on-chip (SoC), an integrated circuit, or the like.

Figure 4A:
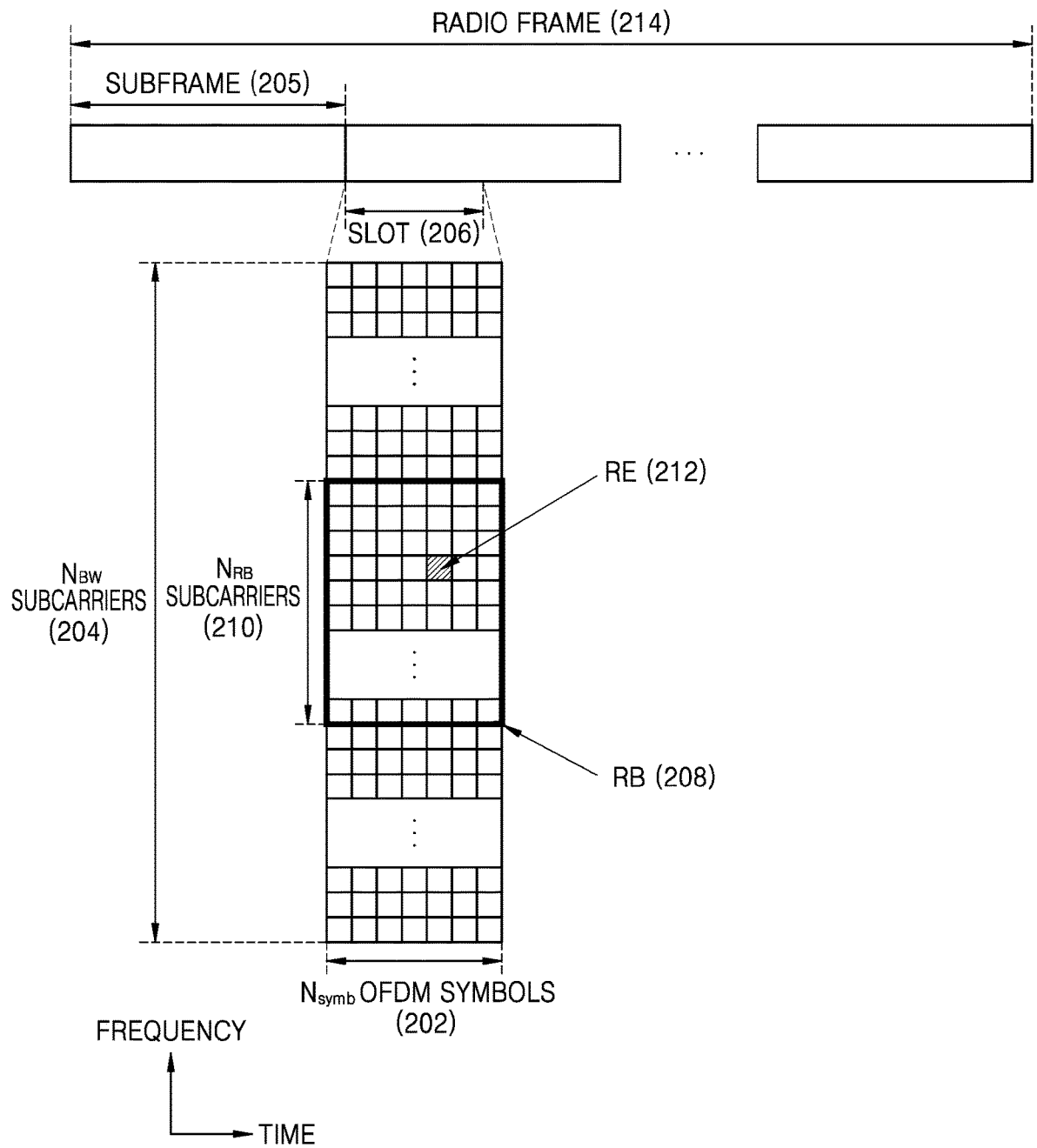
FIG. 4A is a diagram illustrating the basic structure of a time-frequency domain, which is a wireless resource domain in a wireless communication system.
Figure 4B:
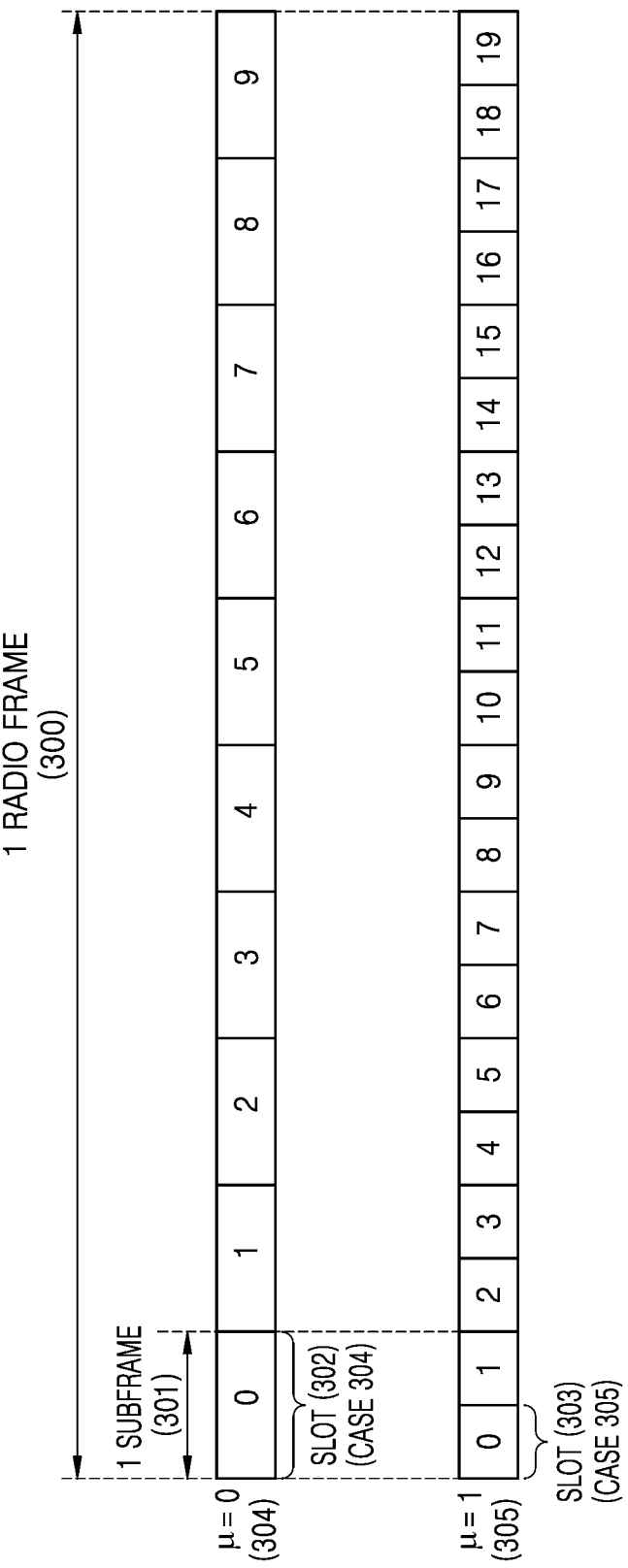
FIG. 4B is a diagram illustrating the slot structure of a wireless communication system.
Figure 4C:
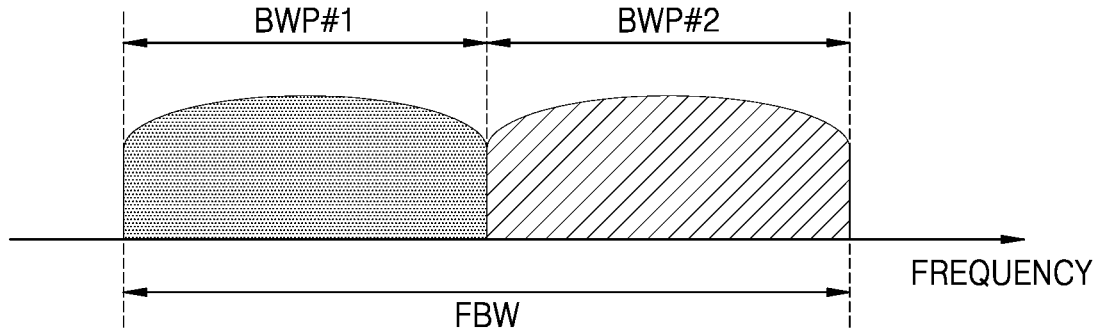
FIG. 4C is a diagram of an implementation of bandwidth parts in a wireless communication system.
Figure 4D:
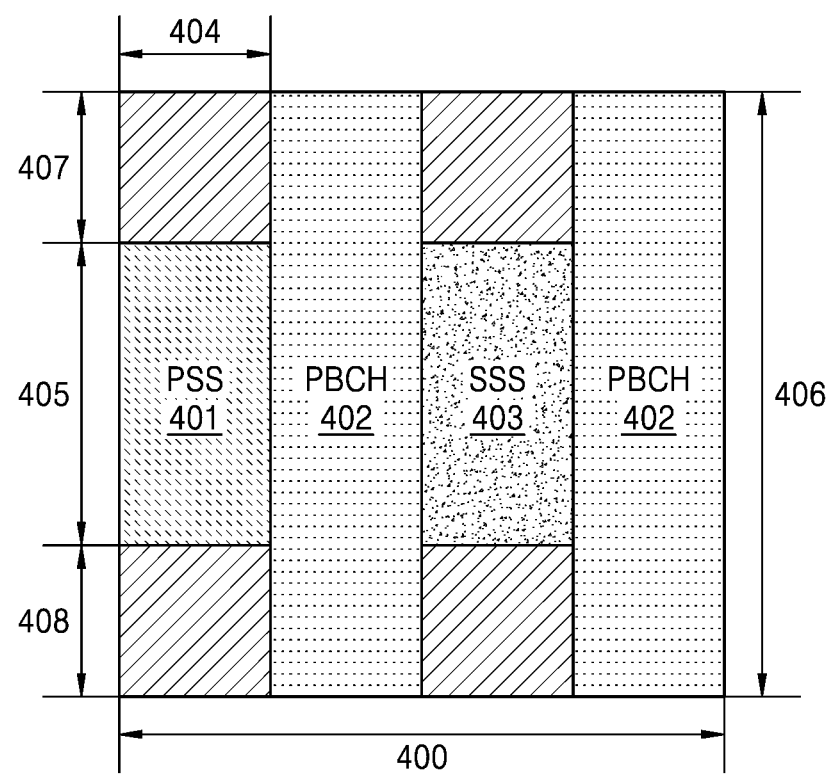
FIG. 4D is a diagram of an example of a synchronization signal block (SSB) in a wireless communication system.
Figure 4E:
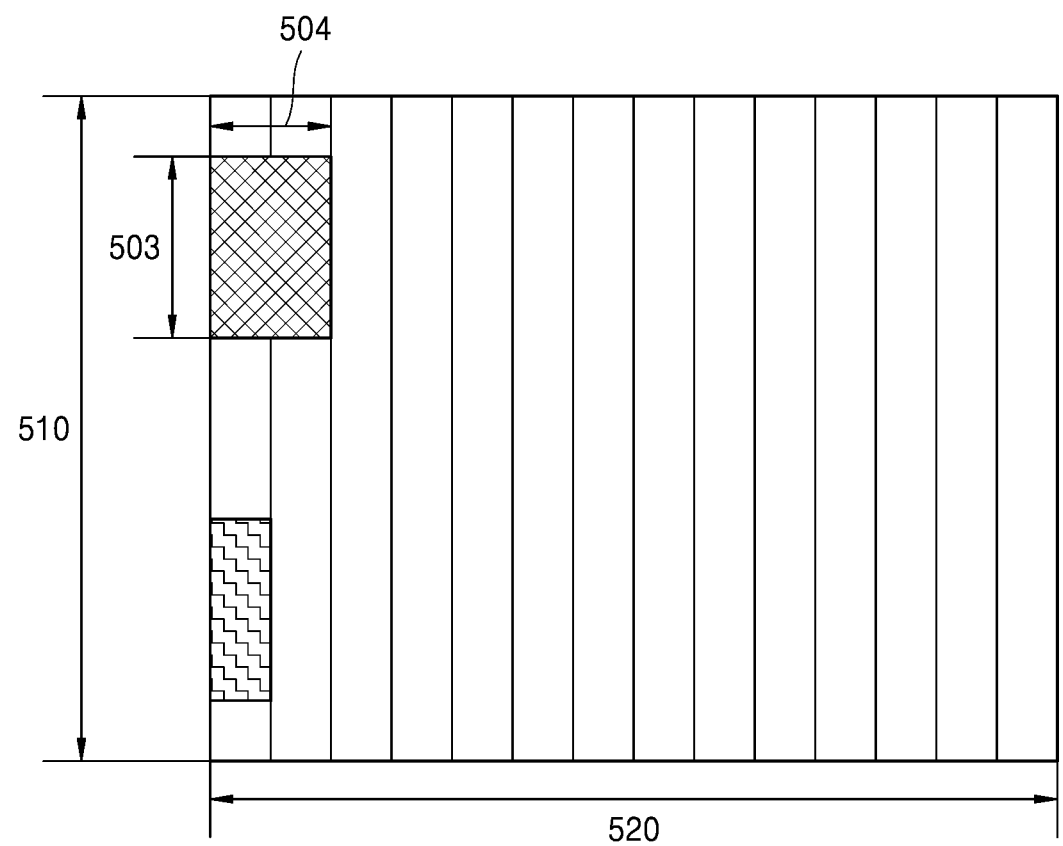
FIG. 4E is a diagram of an example of a CORESET in a wireless communication system.
Figure 4F:
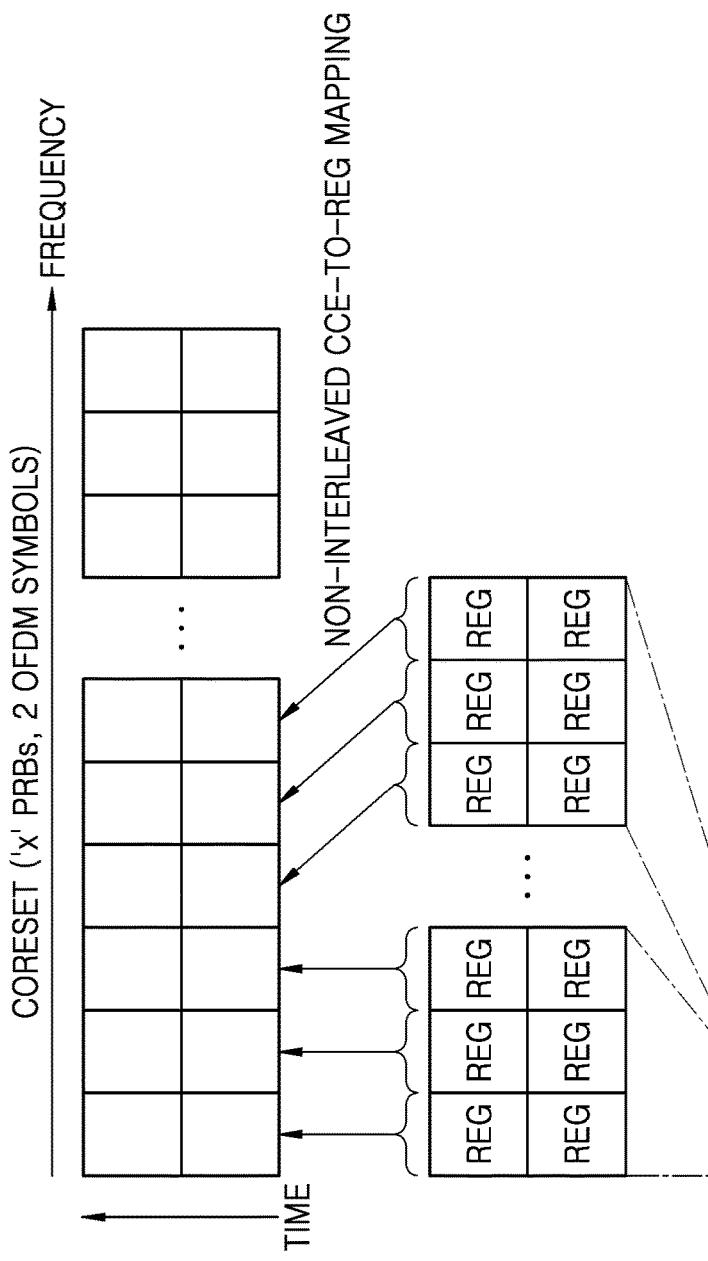
FIG. 4F is a diagram illustrating the structure of a CORESET in a wireless communication system.

FIG. 4A is a diagram illustrating the basic structure of a time-frequency domain, which is a wireless resource domain in a wireless communication system. FIG. 4B is a diagram illustrating the slot structure of a wireless communication system. FIG. 4C is a diagram illustrating an implementation of first and second bandwidth parts BWP #1 and BWP #2 in a wireless communication system. FIG. 4D is a diagram illustrating an example of an synchronization signal block (SSB) in a wireless communication system. FIG. 4E is a diagram illustrating an example of a CORESET in a wireless communication system. FIG. 4F is a diagram illustrating the structure of a CORESET in a wireless communication system.

Referring to FIG. 4A, the horizontal axis is a time domain and the vertical axis is a frequency domain. A minimum transmission unit in the time domain is an orthogonal frequency division multiplexing (OFDM) symbol, and $N_{symb}$ OFDM symbols 202 may constitute a single slot 206. Two slots may constitute a single subframe 205. For example, the length of the slot 206 may be 0.5 ms, and the length of the subframe 205 may be 1.0 ms. However, this is just an example, and the length of the slot 206 may vary with the configuration thereof according to another example embodiment. The number of slots 206 included in the subframe 205 may vary with the length of the slot 206. The time-frequency domain may be defined based on the slot 206 in an NR network. A radio frame 214 may correspond to a time-domain unit constituted of ten subframes 205.

A minimum transmission unit in the frequency domain is a subcarrier, and a total system transmission bandwidth may include NBW subcarriers 204. A basic unit of a resource in the time-frequency domain may be a resource element (RE) 212 and may be represented by an OFDM symbol index and a subcarrier index. A resource block (RB) 208 may be defined by $N_{symb}$ OFDM symbols 202 consecutive in the time domain and $N_{RB}$ subcarriers 210 consecutive in the frequency domain. Accordingly, one RB 208 may include $N_{symb}*N_{RB}$ REs 212. An RB pair may correspond to a unit of two RBs 208 concatenated along the time axis and include $2N_{symb}*N_{RB}$ REs 212.

Some of the resources in the time-frequency domain in FIG. 4A may be included in a CORESET region of a serving cell, and a part of the CORESET region may be outside a narrow band. In an example embodiment, the narrow band may be defined as a band that is less than 5 MHz. In some example embodiments, the narrow band may be defined as including at most 24 RBs on the frequency axis, based on a subcarrier spacing of 15 kHz. However, this is just an example, and the disclosure and/or the embodiments are not limited thereto. The narrow band may be defined as a band, with respect to which a serving cell needs to provide pointing information to a UE.

A UE may receive pointing information, which indicates a CORESET valid region, from a serving cell and may selectively decode a portion of a CORESET, which corresponds to the CORESET valid region.

Referring further to FIG. 4B, a frame or a radio frame 300 may be defined to be 10 ms, and a subframe 301 may be defined to be 1 ms. The radio frame 300 may include a total of ten subframes 301. Each of a slot 302 and a slot 303 may be defined to be 14 OFDM symbols. That is, the number of symbols per slot ($N_{symb}^{slot}$)=14 according to an example embodiment. The subframe 301 may include one slot 302 or a plurality of slots 303. The number of slots 302 or 303 per one subframe 301 may vary with a subcarrier spacing set value or the number of symbols included in the slot 302 or 303. FIG. 4B shows a case 304 where the subcarrier spacing set value μ=0 and a case 305 where the subcarrier spacing set value μ=1. In the case 304 where the subcarrier spacing set value μ=0, the subframe 301 may include one slot 302. In the case 304 where the subcarrier spacing set value μ=1, the subframe 301 may include two slots 303.

As described above, the number of slots per subframe may vary with the subcarrier spacing set value μ, and accordingly, the number of slots per frame may be changed. The number of slots per subframe according to the subcarrier spacing set value μ, $N_{slot}^{subframe, \mu}$, and the number of slots per frame according to the subcarrier spacing set value μ, $N_{slot}^{frame, \mu}$, may be defined as shown in Table 1.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In some example embodiments, the number of slots per subframe may vary with the number of symbols included in one slot. For example, the subcarrier spacing set value may be one of 0, 1, 2, 3, and 4, which respectively indicate 15 kHz, 30 kHz, 60 kHz, 120 kHz, and 240 kHz.

In an example embodiment, the subcarrier spacing set value μ may be limited to 0 in a narrow band. In other words, a subcarrier spacing of 15 kHz may be set in the narrow band. Accordingly, there may be idle fields that are not used among the fields of an MIB in the narrow band, and at least one of the idle fields may be used to generate pointing information.

Referring further to FIG. 4C, a full bandwidth FBW may be configured to include the first bandwidth part BWP #1 and the second bandwidth part BWP #2. This is just an example, and the disclosure and/or the embodiments are not limited thereto. The full bandwidth FBW may be configured to include at least three bandwidth parts. Hereinafter, an example in which two bandwidth parts, e.g., the first bandwidth part BWP #1 and the second bandwidth part BWP #2, are set is mainly described, but the disclosure and/or the embodiments are not limited thereto.

With respect to each of the first and second bandwidth parts BWP #1 and BWP #2, information including a bandwidth part identifier, a bandwidth part location, a subcarrier spacing, a cyclic prefix, or the like may be individually configured. A serving cell may provide information about the first and second bandwidth parts BWP #1 and BWP #2 to a UE through higher layer signaling, e.g., remote radio control (RRC) signaling. At least one of the first and second bandwidth parts BWP #1 and BWP #2 may be activated. An indication indicating whether a configured bandwidth part is activated may be provided from a serving cell to a UE semi-statically through RRC signaling or dynamically through a MAC control element (CE) or DCI.

In an example embodiment, one of the first and second bandwidth parts BWP #1 and BWP #2 may correspond to a narrow band, and a serving cell may provide an indication indicating whether the narrow band is activated to a UE through RRC signaling, MAC CE, or DCI. The UE may recognize, based on the indication from the serving cell, that the narrow band is activated and perform operations in the narrow band, according to some example embodiments.

Referring further to FIG. 4D, an synchronization signal block (SSB) 400 may include a primary synchronization signal (PSS) 401, a physical broadcast channel (PBCH) 402, and a secondary synchronization signal (SSS) 403.

Each of the PSS 401 and the SSS 403 may be transmitted on twelve RBs 405 on the frequency axis and one OFDM symbol 404 on the time axis. In an NR network, a total of 1008 different cell identities (IDs) may be defined. The PSS 401 may have three different values according to a physical cell ID, and the SSS 403 may have 336 different values.

The PBCH 402 may be transmitted on 24 RBs 406 on the frequency axis and two separate OFDM symbols on the time axis. An MIB including various pieces of system information may be transmitted to a UE through the PBCH 402. The MIB may include a dmrs-typeA-position field indicating a position of the first demodulation reference signal (DMRS) in the first downlink and uplink transmission, a PDCCH configSIB1 field indicating configuration information regarding a common search space and PDCCH parameters, a subcarrier spacing common field indicating a subcarrier spacing value, and an SSB subcarrier offset field indicating an offset value between an SSB and a resource block grid. In an example embodiment, pointing information in a narrow band may be constituted of at least one of the PDCCH configSIB1 field, the subcarrier spacing common field, or the SSB subcarrier offset field.

The SSB 400 may be mapped to a total of four OFDM symbols, and the transmission bandwidth of the PSS 401 and the SSS 403 is different from the transmission bandwidth (i.e., the 24 RBs 406) of the PBCH 402. For example, the transmission bandwidth of the PSS 401 is twelve RBs 405, while the transmission bandwidth of the PBCH 402 is 24 RBs 406. Accordingly, regions 407 and 408 other than the twelve RBs 405 in the center of an OFDM symbol, in which either the PSS 401 or the SSS 403 is transmitted, may be used to transmit other types of signals or may be empty.

A UE may obtain a system information block (SIB) by decoding a PDCCH and a PDSCH, based on system information included in an MIB received from a serving cell. The SIB may include an uplink cell bandwidth, a random access parameter, a paging parameter, a parameter related to uplink power control, or the like. The UE may form a wireless link with the serving cell through random access, based on network synchronization and system information obtained during a cell search.

In an example embodiment, a UE may identify a CORESET valid region, based on pointing information included in an MIB, and may selectively decode a portion of a CORESET, which corresponds to the CORESET valid region.

Referring further to FIG. 4E, two CORESETs, e.g., a first CORESET CORESET #1 and a second CORESET CORESET #2, may be configured in a full bandwidth 510 on the frequency axis and one slot 520 on the time axis. The first CORESET CORESET #1 and the second CORESET CORESET #2 may be configured to a particular frequency resource 503 in the full bandwidth 510 on the frequency axis. Each of the first CORESET CORESET #1 and the second CORESET CORESET #2 may be configured with one or more OFDM symbols on the time axis, wherein one or more OFDM symbols may be defined as a duration S04 of each of the first CORESET CORESET #1 and the second CORESET CORESET #2. For example, the first CORESET CORESET #1 may be configured with a duration of two OFDM symbols, and the second CORESET CORESET #2 may be configured with a duration of one OFDM symbol.

Here, a CORESET region may refer to a space occupied by a CORESET in time-frequency resources. According to the length of the particular frequency resource 503, a part of each of the first CORESET CORESET #1 and the second CORESET CORESET #2 may be outside a narrow band. According to an example embodiment, a valid region may be defined in each of the first CORESET CORESET #1 and the second CORESET CORESET #2.

Referring further to FIG. 4F, a CORESET may include "x" physical RBs (PRBs) on the frequency axis and two OFDM symbols on the time axis. In detail, the CORESET may include a plurality of RE groups (REGs), and two REGs may constitute a single REG bundle. For example, an REG may include twelve REs on the frequency axis and one OFDM symbol on the time axis. A control channel elements (CCE) may include six REGs. REGs included in first to sixteenth CCEs #1 to #16 may undergo non-interleaved CCE-to-REG mapping. In some example embodiments, REGs included in the first to sixteenth CCEs #1 to #16 may undergo interleaved CCE-to-REG mapping.

An aggregation level (AL) may indicate the number of CCEs allocated for a PDCCH. The number of candidates may vary with an AL. For example, when an AL is 1, the first CCE #1, the fifth CCE #5, the ninth CCE #9, and the thirteenth CCE #13 may respectively correspond to first to fourth candidate groups C#1, C#2, C#3, and C#4. When an AL is 2, the first CCE #1 and the second CCE #2 may correspond to a fifth candidate group C#5, and the ninth CCE #9 and the tenth CCE #10 may correspond to a sixth candidate group C#6. When an AL is 4, the first to fourth CCEs #1, #2, #3, and #4 may correspond to a seventh candidate group C#7. Candidate groups refer to a blind decoding target to receive (or obtain) a PDCCH transmitted from a serving cell to a UE, and accordingly, an AL may be related to search space configuration.

In an example embodiment, a UE may identify a valid region of a CORESET, based on pointing information, and perform blind decoding on at least one candidate group corresponding to the valid region among the first to seventh candidate groups C#1 to C#7. Here, a candidate group may be referred to as a PDCCH candidate group.

Figure 5:
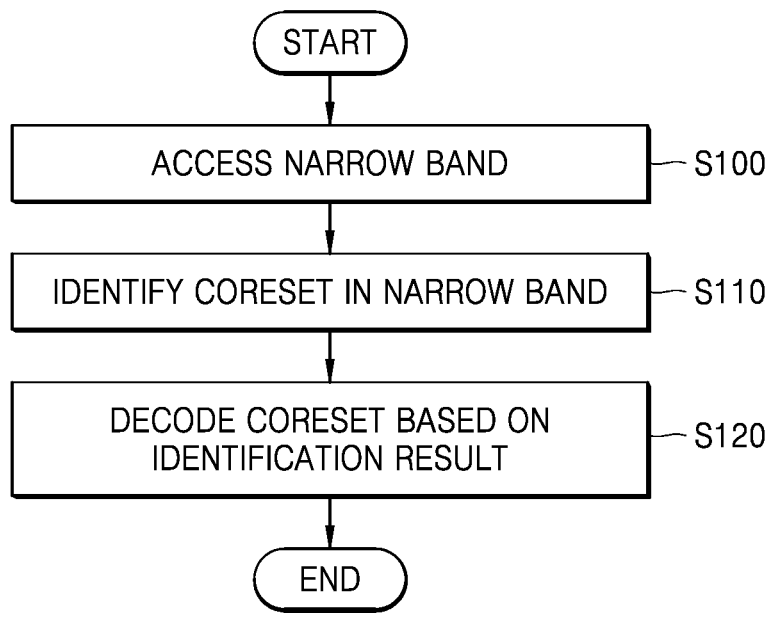
FIG. 5 is a flowchart of an operating method of a UE, according to an example embodiment.

FIG. 5 is a flowchart of an operating method of a UE, according to an example embodiment.

Referring to FIG. 5, a UE may access a narrow band for NR network-based communication with a serving cell in operation S100. The UE may identify a CORESET in the narrow band in operation S110. In an example embodiment, the UE may receive pointing information from the serving cell and identify a valid region belonging to the narrow band in the CORESET region, based on the pointing information. The UE may decode the CORESET based on an identification result in operation S120. In an example embodiment, the UE may perform blind decoding on a plurality of second PDCCH candidate groups, which are completely located in the valid region, among the first PDCCH candidate groups of the CORESET. In some example embodiments, the UE may further perform blind decoding on third PDCCH candidate groups, of which some REGs are in the valid region and the other REGs are outside the valid region, among the first PDCCH candidate groups of the CORESET. The UE may obtain DCI by decoding the CORESET.

Figure 6A:
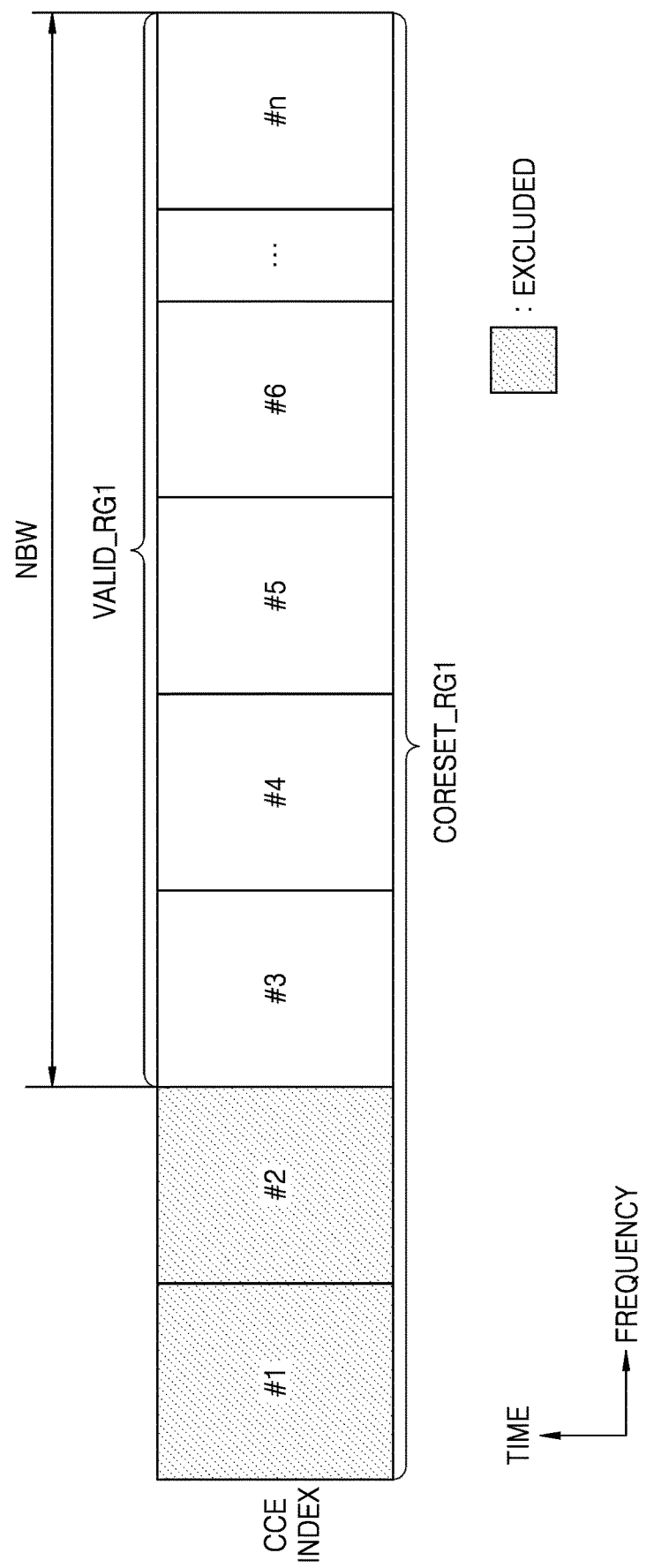
Figure 6C:
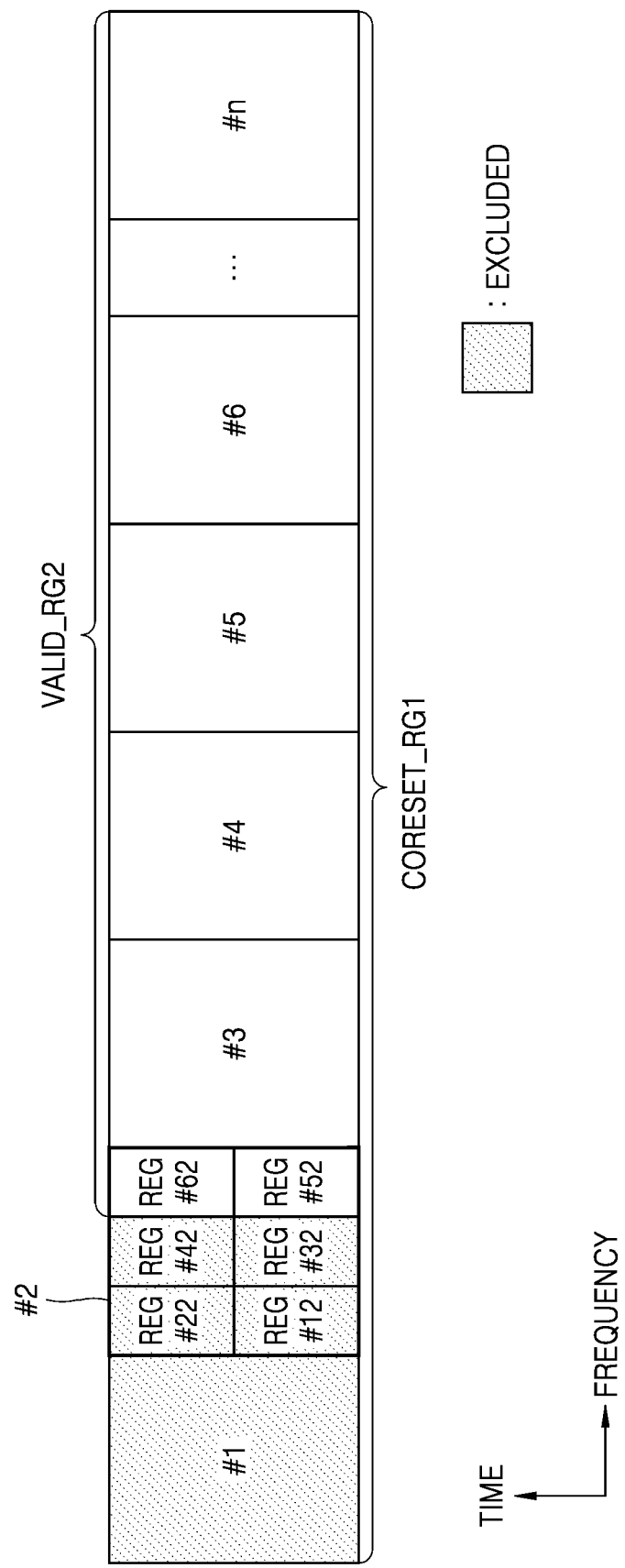

FIGS. 6A to 6C are diagrams for describing the decoding operation of a UE, according to an example embodiment. Fragmentary examples are shown in FIGS. 6A to 6C for clear understanding, and the disclosure and/or the embodiments are not limited thereto.

Referring to FIG. 6A, first CCE #1 to n-th CCE #n may be in a CORESET region CORESET_RG1, where n is an integer. In other words, a CORESET may include the first CCE #1 to the n-th CCE #n. The third CCE #3 to n-th CCE #n may be in a CORESET valid region VALID_RG1 belonging to a narrow bandwidth NBW.

In an example embodiment, a UE may identify the CORESET valid region VALID_RG1, based on pointing information provided by a serving cell and perform blind decoding on PDCCH candidate groups, which are constituted of at least one of the third CCE #3 to the n-th CCE #n in the CORESET valid region VALID_RG1. In other words, the UE may exclude PDCCH candidate groups, which include at least one of the first CCE #1 and the second CCE #2, from a blind decoding target. The serving cell may schedule such that DCI is located in the CORESET valid region VALID_RG1.

As shown in FIG. 6A, the position of the CORESET valid region VALID_RG1 according to an example embodiment may be determined in CCE units. However, this is just an example, and the disclosure and/or the embodiments are not limited thereto. The position of a CORESET valid region VALID_RG2 may be determined in REG units, as shown in FIGS. 6B and 6C. According to an example embodiment, the position of a valid region may be determined in units (e.g., RB units) smaller than REG units. As described above, the disclosure may be applied to any cases regardless of units in which the CORESET valid region VALID_RG1 is determined.

Referring further to FIG. 6B, unlike FIG. 6A, some REGs, e.g., REG #52 and REG #62, of the second CCE #2 and the third CCE #3 to the n-th CCE #n may be in the CORESET valid region VALID_RG2 belonging to a narrow band. According to an The other REGs, i.e., REG #12, REG #22, REG #32, and REG #42, of the second CCE #2 may not belong to the CORESET valid region VALID_RG2.

In an example embodiment, a UE may identify the CORESET valid region VALID_RG2, based on pointing information provided by a serving cell. The UE may exclude the second CCE #2, which is at the boundary of the CORESET valid region VALID_RG2, from a blind decoding target. In other words, the UE may exclude PDCCH candidate groups, which include the second CCE #2, from the blind decoding target. Accordingly, the UE may perform blind decoding on PDCCH candidate groups, which are constituted of at least one of the third CCE #3 to the n-th CCE #n in the CORESET valid region VALID_RG2.

Referring further to FIG. 6C, unlike FIG. 6B, a UE may perform blind decoding on some REGs, e.g., REG #52 and REG #62, of the second CCE #2, which belong to the CORESET valid region VALID_RG2. In detail, the UE may perform blinding decoding on PDCCH candidate groups constituted of at least one of the third CCE #3 to the n-th CCE #n. However, the blind decoding in the second CCE #2 may be limited to some REGs, e.g., REG #52 and REG #62, of the second CCE #2. That is, instead of performing perform blind decoding in the entirety of the second CCE #2, the UE may perform the blind decoding on some REGs, e.g., REG #52 and REG #62.

Figure 7:
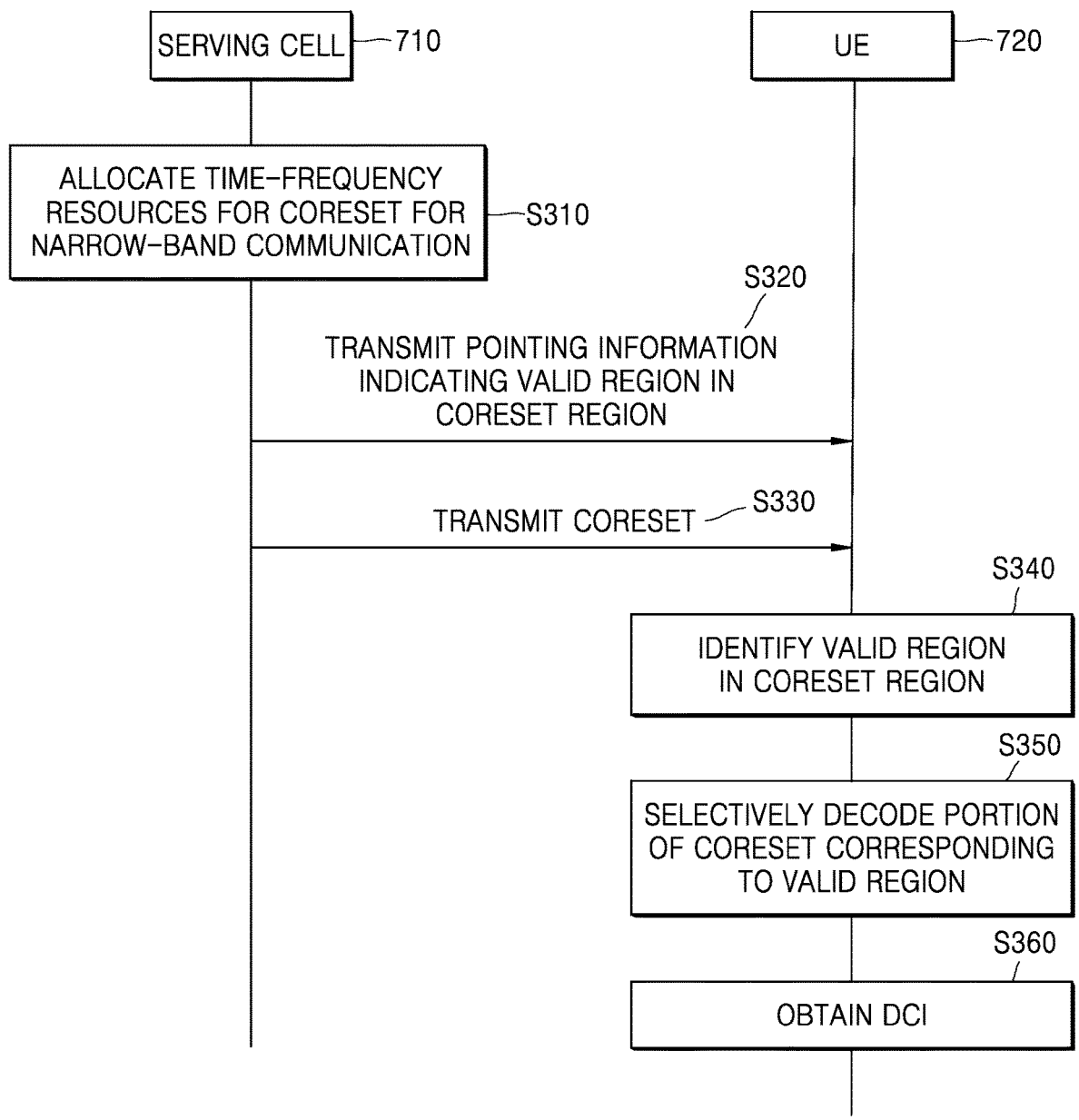
FIG. 7 is a flowchart of an operating method of a wireless communication system, according to an example embodiment.

FIG. 7 is a flowchart of an operating method of a wireless communication system, according to an example embodiment. The wireless communication system may include a serving cell 710 and a UE 720.

Referring to FIG. 7, the serving cell 710 may allocate a CORESET to time-frequency resources for narrow-band communication in operation S310. The serving cell 710 may transmit pointing information, which indicates a valid region in a CORESET region, to the UE 720 in operation S320. In an example embodiment, the serving cell 710 may transmit, to the UE 720, CORESET configuration information including the pointing information. The CORESET configuration information may be transmitted to the UE 720 through a PBCH of an SSB. The serving cell 710 may transmit the CORESET to the UE 720 through a narrow band in operation S330.

The UE 720 may identify the valid region in the CORESET region, based on the pointing information, in operation S340. The UE 720 may selectively decode a portion of the CORESET, which corresponds to the valid region, in operation S350. The UE 720 may obtain DCI from a decoding result in operation S360. Thereafter, the UE 720 may receive a PDSCH from the serving cell 710, based on the DCI.

Figure 8A:
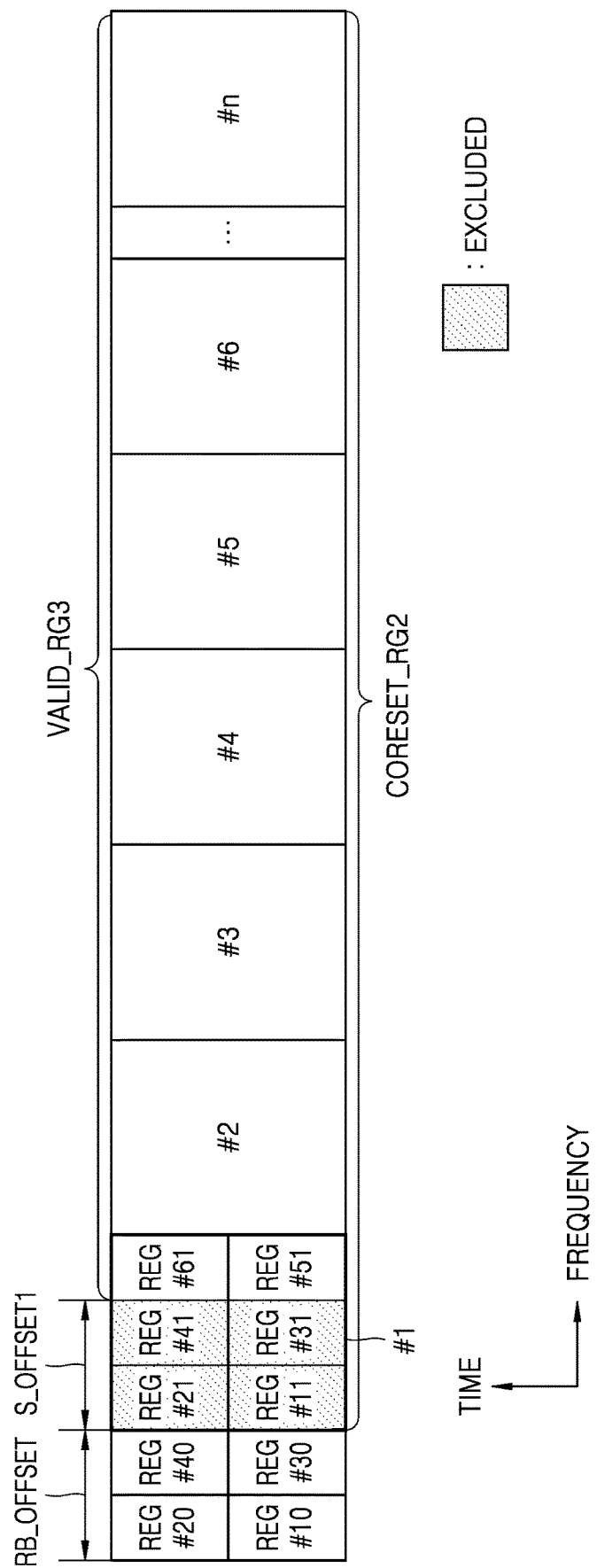
FIGS. 8A to 8C are diagrams for describing pointing information indicating valid regions in a CORESET region, according to example embodiments.
Figure 8B:
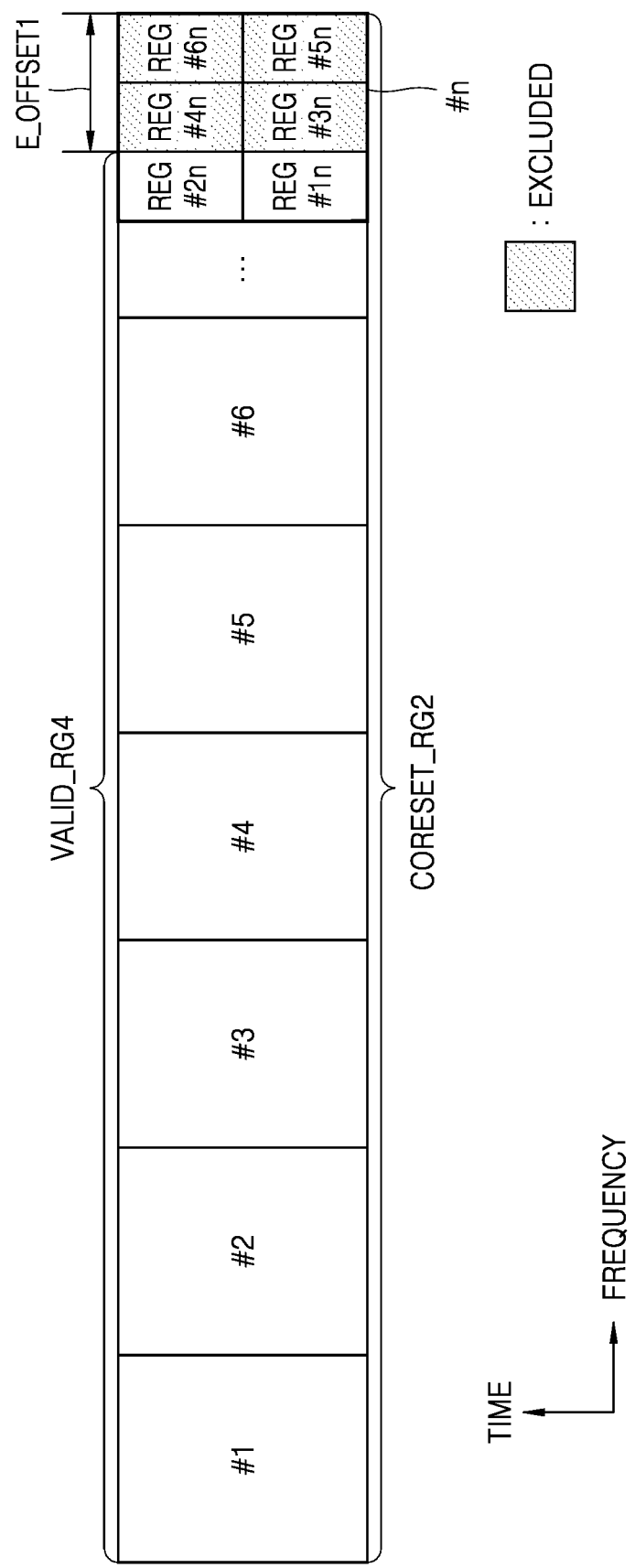
Figure 8C:
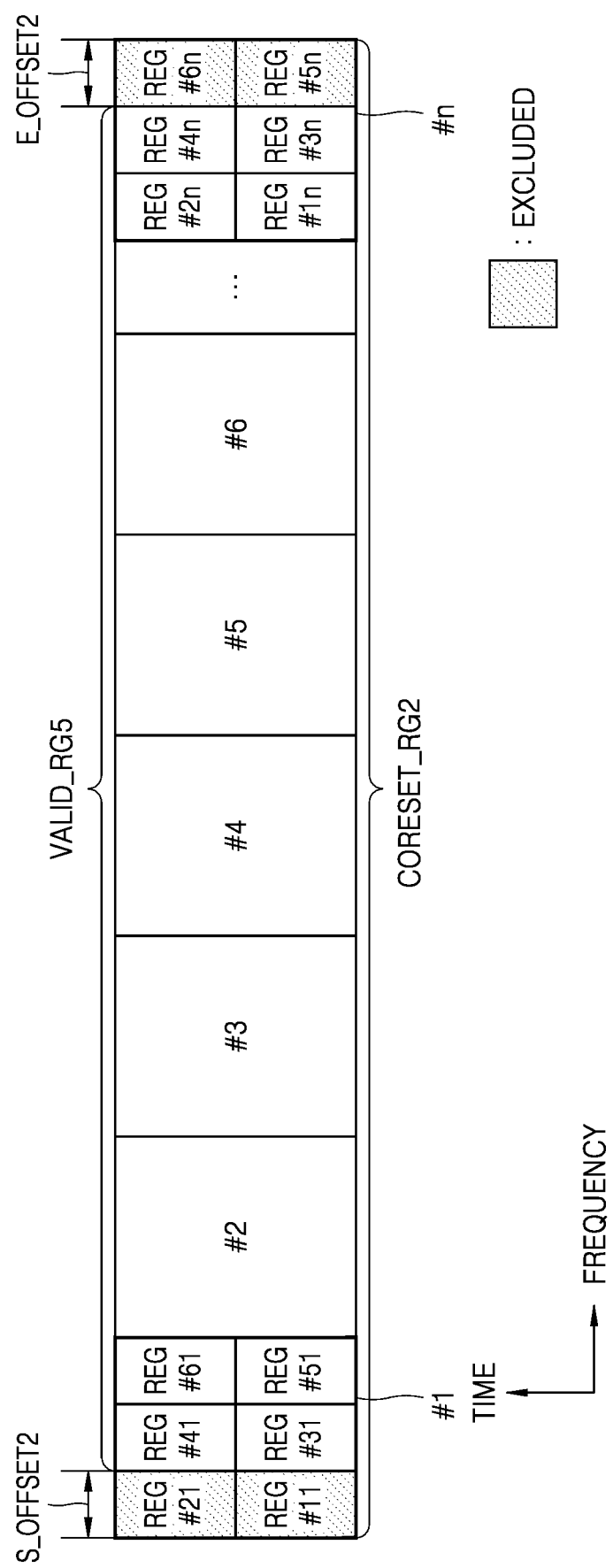

FIGS. 8A to 8C are diagrams for describing pointing information indicating valid regions VALID_RG3, VALID_RG4, and VALID_RG5 in a CORESET region CORESET_RG2, according to example embodiments. Fragmentary examples are shown in FIGS. 8A to 8C for clear understanding, and the disclosure and/or the embodiments are not limited thereto.

Referring to FIG. 8A, the first to n-th CCEs #1 to #n may be located in the CORESET region CORESET_RG2. A serving cell may provide an RB offset RB_OFFSET and a start offset S_OFFSET1 indicating the start point of the valid region VALID_RG3 to a UE as pointing information. The RB offset RB_OFFSET may refer to a difference between the lowest RB index of an SSB and the start RB index of the CORESET region CORESET_RG2. In some example embodiments, the end point of the CORESET region CORESET_RG2 may be provided to the UE as CORESET configuration information. The UE may identify some REGs, e.g., REG #51 and REG #61, of the first CCE #1 and the second CCE #2 to the n-th CCE #n as being valid for blind decoding, based on the RB offset RB_OFFSET and the start offset S_OFFSET1. In other words, the UE may identify some REGs, e.g., REG #51 and REG #61, of the first CCE #1 and the second to n-th CCEs #2 to #n as the valid region VALID_RG3.

Referring to FIG. 8B, unlike FIG. 8A, a serving cell may provide and an end offset E_OFFSET1 indicating the end point of the valid region VALID_RG4 to a UE as pointing information. According to an example, embodiment, the serving cell may also provide the RB offset RB OFFSET as in FIG. 8A. The UE may identify the first CCE #1 to (n−1)-th CCE #n−1 and some REGs, e.g., REG #1n and REG #2n, of the n-th CCE #n as being valid for blind decoding, based on the RB offset RB_OFFSET (in FIG. 8A) and the end offset E_OFFSET1. In other words, the UE may identify the first to (n−1)-th CCEs #1 to #n−1 and some REGs, e.g., REG #1n and REG #2n, of the n-th CCE #n as the valid region VALID_RG4.

Referring to FIG. 8C, unlike FIGS. 8A and 8B, a serving cell may provide a start offset S_OFFSET2 and an end offset E_OFFSET2 respectively indicating the start and end points of the valid region VALID_RG5 to a UE as pointing information. According to an example, embodiment, the serving cell may also provide the RB offset RB_OFFSET as in FIG. 8A. The UE may identify some REGs, e.g., REG #31, REG #41, REG #51, and REG #61, of the first CCE #1, the second CCE #2 to the (n−1)-th CCE #n−1, and some REGs, e.g., REG #1n, REG #2n, REG #3n, and REG #4n, of the n-th CCE #n as being valid for blind decoding, based on the RB offset RB_OFFSET (in FIG. 8A), the start offset S_OFFSET2, and the end offset E_OFFSET2. In other words, the UE may identify, as the valid region VALID_RG5, some REGs, e.g., REG #31, REG #41, REG #51, and REG #61, of the first CCE #1, the second to (n−1)-th CCEs #2 to #n−1, and some REGs, e.g., REG #1n, REG #2n, REG #3n, and REG #4n, of the n-th CCE #n.

Because a narrow band may be variously configured as shown in FIGS. 8A to 8C, each of the valid regions VALID_RG3, VALID_RG4, and VALID_RG5 in the CORESET region CORESET_RG2 may vary with the narrow band, and a serving cell may generate and provide optimal pointing information to a UE, taking into account the relation between the narrow band and each of the valid regions VALID_RG3, VALID_RG4, and VALID_RG5.

Figure 9:
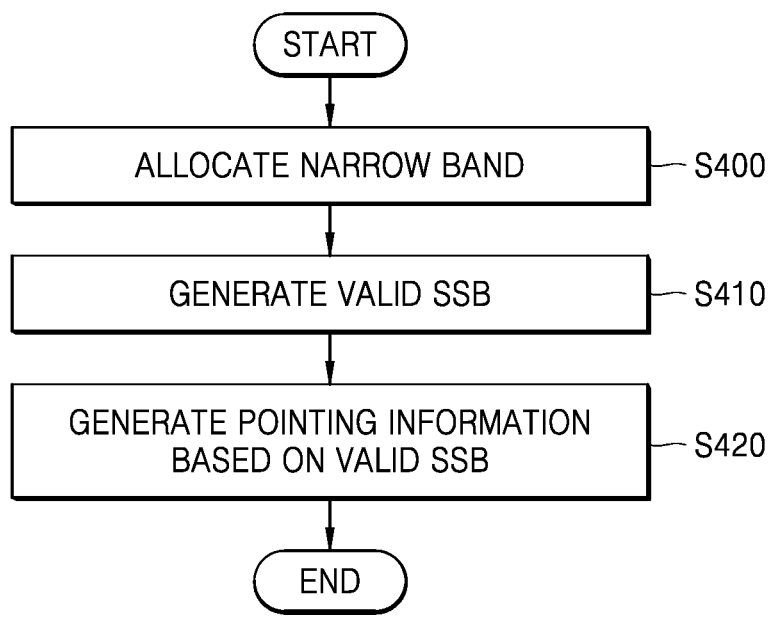
FIG. 9 is a flowchart of an operating method of a serving cell, according to an example embodiment.

FIG. 9 is a flowchart of an operating method of a serving cell, according to an example embodiment.

Referring to FIG. 9, a serving cell may allocate a narrow band for communication with a UE in operation S400. The serving cell may generate a valid SSB, taking into account the narrow band, in operation S410. In an example embodiment, the serving cell may generate the valid SSB corresponding to the narrow band by processing a portion of the SSB, wherein the portion of the SSB is outside the narrow band. According to an example embodiment, the serving cell may generate the valid SSB corresponding to the narrow band by puncturing a portion of the SSB. In detail, a frequency region, in which the valid SSB is transmitted, may coincide with the narrow band. The serving cell may generate pointing information indicating a CORESET valid region, based on the valid SSB, in operation S420. In detail, the serving cell may generate the pointing information indicating the CORESET valid region, based on the position of the valid SSB on the frequency axis.

Figure 10A:
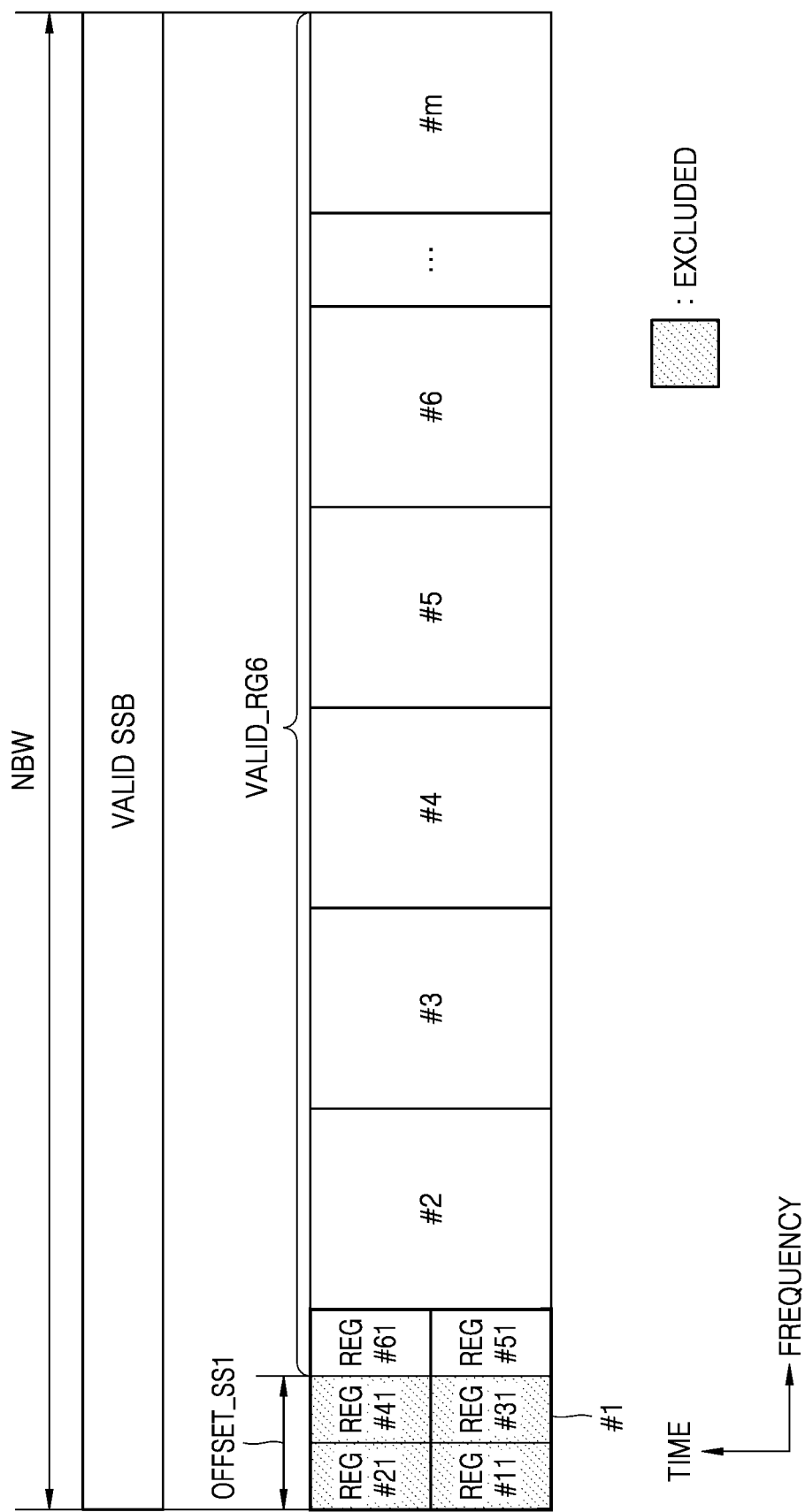
FIGS. 10A to 10C are diagrams for describing pointing information indicating valid regions in a CORESET region, according to example embodiments.
Figure 10B:
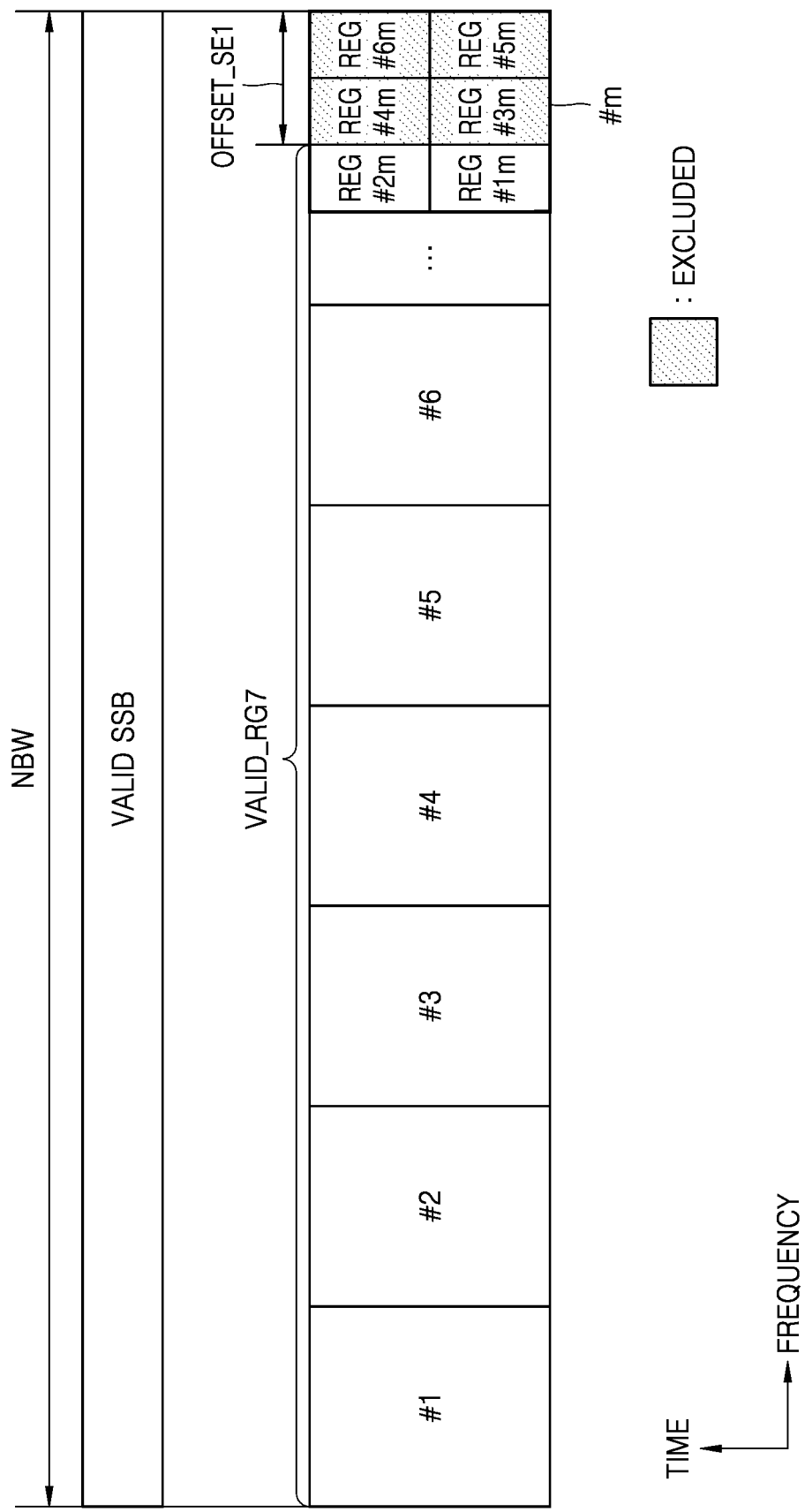
Figure 10C:
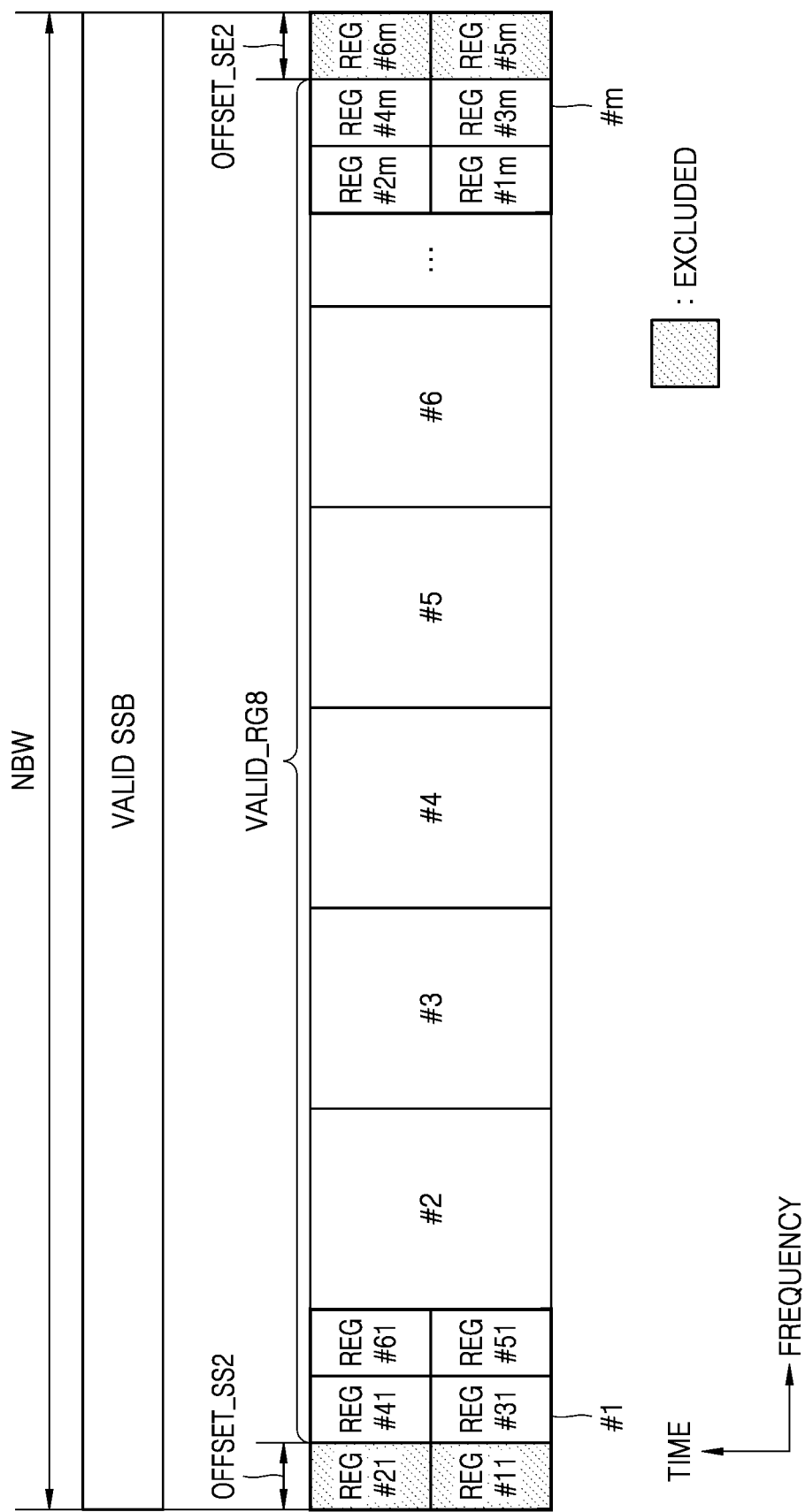

FIGS. 10A to 10C are diagrams for describing pointing information indicating valid regions VALID_RG6, VALID_RG7, and VALID_RG8 in a CORESET region, according to example embodiments. It is assumed in FIGS. 10A to 10C that a frequency region, in which a valid SSB is transmitted, coincides with a narrow bandwidth NBW and is longer than each of the CORESET valid regions VALID_RG6, VALID_RG7, and VALID_RG8. In other words, a band occupied by each of the CORESET valid regions VALID_RG6, VALID_RG7, and VALID_RG8 may be narrower than a band occupied by the valid SSB. However, fragmentary examples are shown in FIGS. 10A to 10C for clear understanding, and the disclosure and/or the embodiments are not limited thereto.

Referring to FIG. 10A, a serving cell may set the CORESET valid region VALID_RG6 in the same frequency region as the valid SSB. The serving cell may provide a start offset OFFSET_SS1, which indicates the start point of the CORESET valid region VALID_RG6 based on the start point of the valid SSB, to a UE as pointing information. In some example embodiments, the serving cell may additionally provide the UE with information indicating the number of symbols in the valid region VALID_RG6 or information indicating a region (including some REGs, e.g., REG #11, REG #21, REG #31, REG #41, of the first CCE #1) other than the valid region VALID_RG6. The serving cell may provide the narrow bandwidth NBW or the start and end points of the valid SSB to the UE through higher layer signaling.

The UE may identify some REGs, e.g., REG #51 and REG #61, of the first CCE #1 and the second to m-th CCEs #2 to #m as being valid for blind decoding, based on the start and end points of the valid SSB and the start offset OFFSET_SS1. In other words, the UE may identify some REGs, e.g., REG #51 and REG #61, of the first CCE #1 and the second to m-th CCEs #2 to #m as the valid region VALID_RG6.

The UE may recognize the number of CCEs that undergo blind decoding, based on the number of RBs of a CORESET in the valid region VALID_RG6, the number of symbols of the CORESET in the valid region VALID_RG6, and an REG bundle size.

In some example embodiments, the UE may recognize the number of CCEs that undergo blind decoding, based on the number of RBs of the valid SSB, the number of symbols of the CORESET in the valid region VALID_RG6, and the REG bundle size.

Referring to FIG. 10B, unlike FIG. 10A, a serving cell may provide an end offset OFFSET_SE1, which indicates the end point of the CORESET valid region VALID_RG7 of a CORESET based on the end point of the valid SSB, to a UE as pointing information.

The UE may identify the first to (m−1)-th CCEs #1 to #m−1 and some REGs, e.g., REG #1m and REG #2m, of the m-th CCE #m as being valid for blind decoding, based on the start and end points of the valid SSB and the end offset OFFSET_SE1. In other words, the UE may identify the first to (m−1)-th CCEs #1 to #m−1 and some REGs, e.g., REG #1m and REG #2m, of the m-th CCE #m as the valid region VALID_RG7.

Referring to FIG. 10C, unlike FIGS. 10A and 10B, a serving cell may provide a start offset OFFSET_SS2 and an end offset OFFSET_SE2, which respectively indicate the start and end points of the CORESET valid region VALID_RG8 based on the start and end points of the valid SSB, to a UE as pointing information.

The UE may identify some REGs, e.g., REG #31, REG #41, REG #51, and REG #61, of the first CCE #1, the second to (m−1)-th CCEs #2 to #m−1, and some REGs, e.g., REG #1m, REG #2m, REG #3m, and REG #4m, of the m-th CCE #m as being valid for blind decoding, based on the start and end points of the valid SSB, the start offset OFFSET_SS2, and the end offset OFFSET_SE2. In other words, the UE may identify, as the valid region VALID_RG8, some REGs, e.g., REG #31, REG #41, REG #51, and REG #61, of the first CCE #1, the second to (m−1)-th CCEs #2 to #m−1, and some REGs, e.g., REG #1m, REG #2m, REG #3m, and REG #4m, of the m-th CCE #m.

A narrow band may be variously configured as shown in FIGS. 10A to 10C, and a valid SSB may vary with the various configurations. Each of the valid regions VALID_RG6, VALID_RG7, and VALID_RG8 in a CORESET region may vary with the narrow band, and a serving cell may generate and provide optimal pointing information based on the position of the valid SSB to a UE, taking into account the relation between the valid SSB corresponding to the narrow band and each of the valid regions VALID_RG6, VALID_RG7, and VALID_RG8.

Figure 11:
FIG. 11 is a diagram illustrating the PDCCH configSIB1 field of a master information block (MIB) so as to describe an example of the configuration of pointing information, according to an example embodiment.

FIG. 11 is a diagram illustrating the PDCCH configSIB1 field of an MIB to describe an example of the configuration of pointing information, according to an example embodiment.

Referring to FIG. 11, the PDCCH configSIB1 field may include an "index" subfield, an "SS/PBCH block and CORESET multiplexing pattern" subfield, a "number of RBs" subfield, a "number of symbols" subfield, and an "offset (RBs)" subfield. As described above, because only a subcarrier spacing of 15 kHz is set in a narrow band, only subfields corresponding to indexes 0 to 5 may be used in the narrow band, and subfields corresponding to the other indexes 6 to 15 may not be used in the narrow band.

In an example embodiment, a serving cell may generate pointing information using the subfields corresponding to the indexes 6 to 15. In some example embodiments, a serving cell may generate pointing information using at least one of the subcarrier spacing common field or the SSB subcarrier offset field, as described above. However, these are just examples, and the disclosure and/or the embodiments are not limited thereto. A serving cell may generate pointing information by using a field that is not used in a narrow band among the fields of an MIB.

Figure 12:
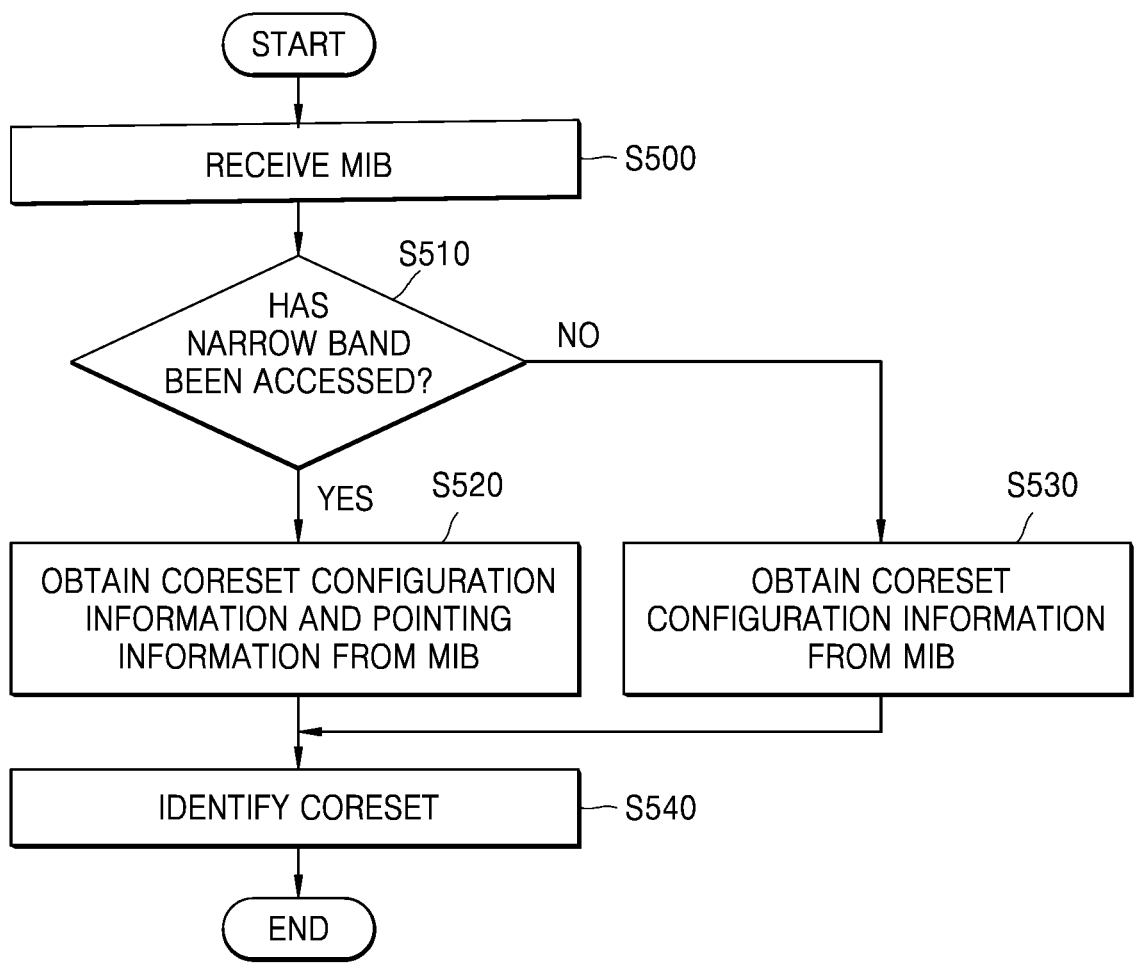
FIG. 12 is a flowchart of an operating method of a UE, according to an example embodiment.

FIG. 12 is a flowchart of an operating method of a UE, according to an example embodiment.

Referring to FIG. 12, a UE may receive an MIB from a serving cell in operation S500. The UE may determine whether a narrow band has been accessed for communication with the serving cell in operation S510. When the answer is "YES" in operation S510, the UE may obtain CORESET configuration information and pointing information from the MIB in operation S520. Otherwise, when the answer is "NO" in operation S510, the UE may obtain CORESET configuration information from the MIB in operation S530. The UE may identify a CORESET using at least one of the CORESET configuration information or the pointing information in operation S540.

In other words, because fields of an existing MIB may be used as described above, the UE may recognize the fields of the existing MIB as the pointing information only when the UE accesses the narrow band. Accordingly, the pointing information may be effectively generated using the fields of the existing MIB, without defining new fields, according to example embodiments.

Figure 13:
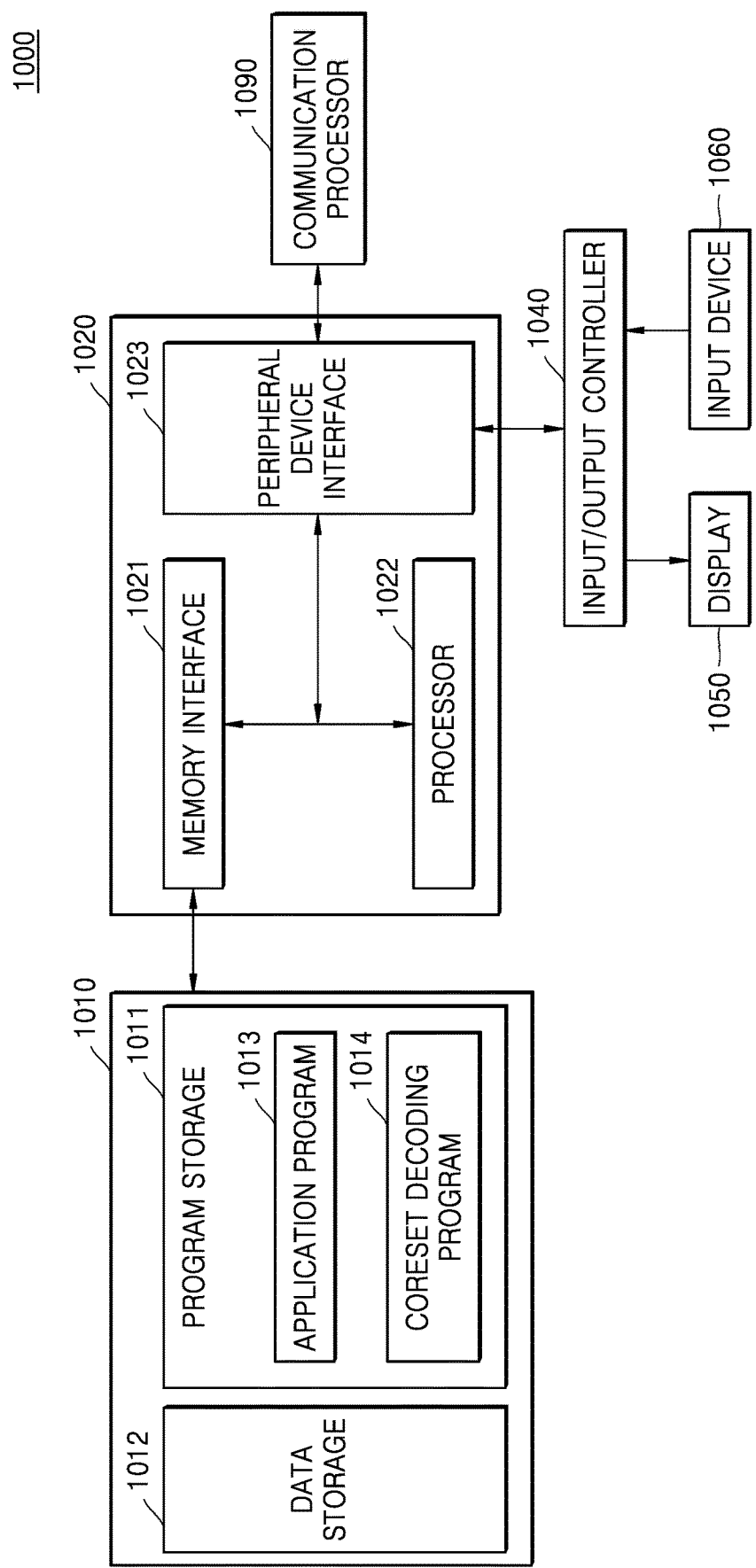
FIG. 13 is a block diagram of an electronic apparatus according to an example embodiment.

FIG. 13 is a block diagram of an electronic apparatus 1000 according to an example embodiment. The electronic apparatus 1000 may correspond to a UE according to an example embodiment.

Referring to FIG. 13, the electronic apparatus 1000 may include a memory 1010, a processor unit 1020, an input/output controller 1040, a display 1050, an input device 1060, and a communication processor 1090. Each element will be described below.

The processor unit 1020 may include a memory interface 1021, a processor 1022 and a peripheral device interface. For example, the processor 1022 may be a central processing unit (CPU), an application processor, a modem-integrated application processor, a system-on-chip (SoC), an integrated circuit, or the like.

The memory 1010 may include a program storage 1011, which stores a program for controlling an operation of the electronic apparatus 1000, and a data storage 1012, which stores data generated during execution of the program. The data storage 1012 may store data necessary for the operation of an application program 1013 and the operation of a CORESET decoding program 1014 or data generated from the operations of the application program 1013 and the CORESET decoding program 1014. According to various example embodiment, there may be a plurality of memories 1010.

The program storage 1011 may include the application program 1013 and the CORESET decoding program 1014. According to an example embodiment, a program included in the program storage 1011 may be a set of instructions and expressed as an instruction set. The application program 1013 may include program code for executing various applications run by the electronic apparatus 1000. In other words, the application program 1013 may include code (or commands) related to various applications run by the processor 1022.

The CORESET decoding program 1014 may include program code for identifying a CORESET valid region in a narrow band based on pointing information and selectively decoding a portion of a CORESET, which corresponds to the CORESET valid region, according to example embodiments. The processor 1022 may decode the CORESET by executing the CORESET decoding program 1014, according to the embodiments described above.

The communication processor 1090 of the electronic apparatus 1000 may perform communication functions for voice communication and data communication. A peripheral device interface 1023 may control connection among the input/output controller 1040, the communication processor 1090, the processor 1022, and a memory interface 1021. The processor 1022 may communicate with one or more base stations to provide a service by using at least one software program. According to an example embodiment, the processor 1022 may control a plurality of base stations to provide a service by using at least one software program. According to an example embodiment, the processor 1022 may execute at least one program stored in the memory 1010 to provide a service corresponding to the program.

The input/output controller 1040 may provide an interface between an input/output device, such as the display 1050 or the input device 1060, and the peripheral device interface 1023. The display 1050 displays status information, input text, a moving picture, and/or a still picture. For example, the display 1050 may display information about an application program run by the processor 1022.

The input device 1060 may provide input data, which is generated by the selection of the electronic apparatus 1000, to the processor unit 1020 through the input/output controller 1040. According to an example embodiment, the input device 1060 may include a keypad, which includes at least one hardware button, and/or a touch pad sensing touch information. For example, the input device 1060 may provide touch information, such as a touch, a movement of the touch, or the release of the touch, which is detected through a touch pad, to the processor 1022 through the input/output controller 1040.

Figure 14:
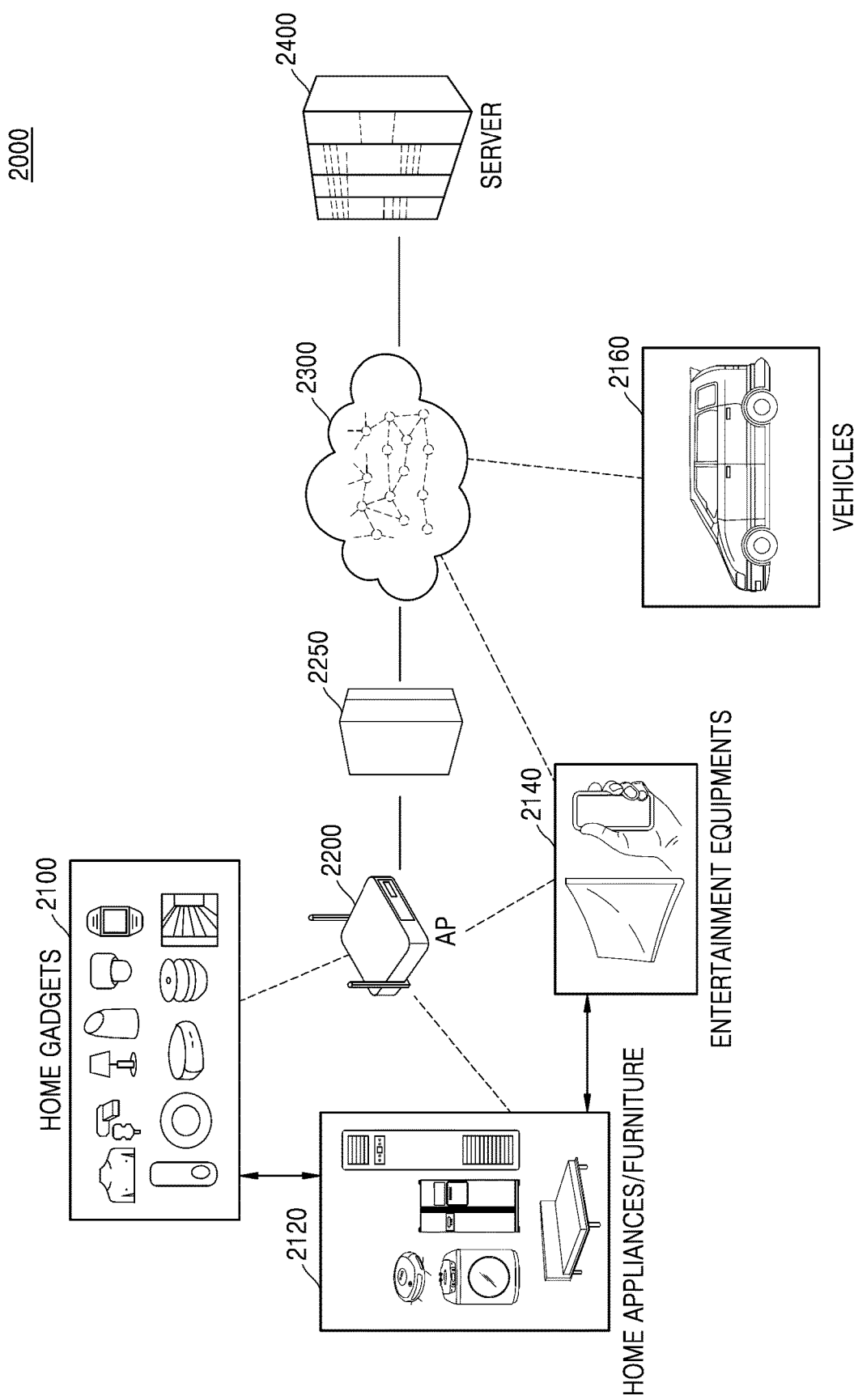
FIG. 14 is a conceptual diagram of an Internet of things (IoT) network system using embodiments.

FIG. 14 is a conceptual diagram of an Internet of things (IoT) network system 2000 according to an example embodiment.

Referring to FIG. 14, the IoT network system 2000 may include a plurality of IoT devices (2100, 2120, 2140, and 2160), an access point (AP) 2200, a gateway 2250, a wireless network 2300, and a server 2400. IoT may refer to a network among things using wired/wireless communication.

The IoT devices may be grouped based on their characteristics. For example, the IoT devices may be divided into a group of home gadgets 2100, a group of home appliances/furniture 2120, a group of entertainment equipments 2140, and a group of vehicles 2160. However, the disclosure is not limited thereto, and as such, according to another example embodiment, the IoT devices may be grouped in another manner. A plurality of IoT devices, e.g., the home gadgets 2100, the home appliances/furniture 2120, and the entertainment equipments 2140 may be connected to a communication network or another IoT device through the AP 2200. The AP 2200 may be embedded in one IoT device. The gateway 2250 may change a protocol to allow the AP 2200 to access an external wireless network. IoT devices, e.g., the home gadgets 2100, the home appliances/furniture 2120, and the entertainment equipments 2140, may be connected to an external communication network through the gateway 2250. The wireless network 2300 may include Internet and/or a public network. IoT devices, e.g., the home gadgets 2100, the home appliances/furniture 2120, and the entertainment equipments 2140, and the vehicles 2160, may be connected to the server 2400, which provides a certain service, through the wireless network 2300, and users may use the service through at least one of the IoT devices, e.g., the home gadgets 2100, the home appliances/furniture 2120, and the entertainment equipments 2140, and the vehicles 2160.

According to example embodiments, IoT devices, e.g., the home gadgets 2100, the home appliances/furniture 2120, and the entertainment equipments 2140, and the vehicles 2160, may perform communication in a narrow band and thus exchange pointing information with each other and perform decoding on a CORESET valid region based on the pointing information. Consequently, IoT devices, e.g., the home gadgets 2100, the home appliances/furniture 2120, and the entertainment equipments 2140, and the vehicles 2160, may perform communication efficiently and effectively, thereby providing quality services to users.

While the disclosure has been particularly shown and described with reference to embodiments thereof, it will be understood that various changes in form and details may be made therein without departing from the spirit and scope of the following claims.

What is claimed is:

1. An operating method of a user equipment (UE) performing new radio (NR) network-based communication with a serving cell in a narrow band, the operating method comprising:
receiving a Control Resource Set (CORESET) and pointing information from the serving cell;
identifying a valid region in the CORESET based on the pointing information;
selectively decoding a portion of the CORESET corresponding to the valid region; and
obtaining downlink control information (DCI) based on a result of the decoding,
wherein the valid region comprises resource element groups (REGs) belonging to the narrow band, and
wherein the pointing information comprises offset information indicating at least one of a start point or an end point of the valid region.

2. The operating method of claim 1, wherein the narrow band is less than 5 MHz.

3. The operating method of claim 1, further comprises:
receiving CORESET configuration information from the serving cell,
wherein the CORESET configuration information comprises the pointing information.

4. The operating method of claim 1, further comprises:
receiving a master information block (MIB) from the serving cell through a physical broadcast channel (PBCH),
wherein the MIB comprises the pointing information.

5. The operating method of claim 4, wherein the pointing information is included in one or more of fields that are not used in the narrow band among fields of the MIB.

6. The operating method of claim 5, wherein the one or more fields comprises at least one a subcarrier spacing common field, an SSB subcarrier offset field, or a PDCCH configSIB1 field.

7. The operating method of claim 1, further comprising receiving, from the serving cell, a valid synchronization signal block (SSB) corresponding to the narrow band,
wherein the pointing information comprises the offset information indicating the at least one of the start point or the end point of the valid region based on a position of the valid SSB.

8. The operating method of claim 7, wherein a band occupied by the valid region is narrower than a band occupied by the valid SSB.

9. The operating method of claim 1, wherein the selectively decoding of the portion of the CORESET comprises:
identifying a plurality of second physical downlink control channel (PDCCH) candidate groups that are completely in the valid region among a plurality of first PDCCH candidate groups of the CORESET; and
performing blind decoding on the plurality of second PDCCH candidate groups.

10. An operating method of a serving cell performing new radio (NR) network-based communication with a user equipment (UE), the operating method comprising:
allocating a narrow band for communication with the UE;
generating pointing information and a CORESET, the pointing information indicating a valid region in a region of the CORESET, the valid region comprising a plurality of physical downlink control channel (PDCCH) candidate groups to be decoded by the UE; and
transmitting the CORESET and the pointing information to the UE,
wherein the valid region comprises resource element groups (REGs) belonging to the narrow band, and
wherein the pointing information comprises offset information indicating at least one of a start point or an end point of the valid region.

11. The operating method of claim 10, wherein the generating of the CORESET comprises allocating downlink control information (DCI) to at least one of the plurality of PDCCH candidate groups.

12. The operating method of claim 10, further comprising:
puncturing a synchronization signal block (SSB) to generate a valid SSB corresponding to the narrow band; and
transmitting the valid SSB to the UE,
wherein the pointing information comprises the offset information indicating the at least one of the start point and the end point of the valid region based on a position of the valid SSB.

13. The operating method of claim 10, wherein the generating of the pointing information comprises generating the pointing information by using one or more fields that are not used in the narrow band among fields of a master information block (MIB) transmitted to the UE through a physical broadcast channel (PBCH).

14. The operating method of claim 10, wherein a subcarrier spacing of 15 kHz is set in the narrow band, and the narrow band includes at most 24 resource blocks (RBs) on a frequency axis.

15. A user equipment (UE) performing new radio (NR) network-based communication with a serving cell in a narrow band, the UE comprising:
a radio frequency (RF) transceiver configured to receive a CORESET and pointing information from the serving cell; and
a controller configured to:
identify a valid region in the CORESET, based on the pointing information,
selectively decode a portion of the CORESET corresponding to the valid region, and
obtain downlink control information (DCI) based on a result of the decoding,
wherein the valid region comprises resource element groups (REGs) belonging to the narrow band, and
wherein the pointing information comprises offset information indicating at least one of a start point or an end point of the valid region.

16. The user equipment of claim 15, wherein the controller is further configured to:
identify a plurality of second physical downlink control channel (PDCCH) candidate groups that belong to the valid region, among a plurality of first PDCCH candidate groups of the CORESET, and
perform blind decoding on the plurality of second PDCCH candidate groups.

17. The user equipment of claim 15, wherein the pointing information is constituted of at least one of a subcarrier spacing common field, a synchronization signal block (SSB) subcarrier offset field, or a PDCCH configSIB1 field among fields of a master information block (MIB).

* * * * *